(12) United States Patent
Cubrilovic et al.

(10) Patent No.: US 11,068,028 B1
(45) Date of Patent: Jul. 20, 2021

(54) DEVICE DOCK

(71) Applicant: Lenovo (Singapore) Pte. Ltd., Singapore (SG)

(72) Inventors: Kathryn Marie Cubrilovic, Morrisville, NC (US); Thomas Perelli, Raleigh, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/734,358

(22) Filed: Jan. 5, 2020

(51) Int. Cl.
*G06F 1/16* (2006.01)
*F21S 8/00* (2006.01)
*F21V 23/04* (2006.01)
*F21V 33/00* (2006.01)

(52) U.S. Cl.
CPC ............ *G06F 1/1632* (2013.01); *F21S 8/03* (2013.01); *F21V 23/04* (2013.01); *F21V 33/0052* (2013.01)

(58) Field of Classification Search
CPC .................. G06F 1/1632; Y10S 248/917–919
USPC ............................ 361/679.41; D14/336, 434
See application file for complete search history.

(56) References Cited

U.S. PATENT DOCUMENTS

| | | | | |
|---|---|---|---|---|
| 7,320,451 B2* | 1/2008 | Ogawa | .................... | F16M 11/10 248/125.1 |
| 7,580,248 B2* | 8/2009 | Ogawa | ..................... | H04N 5/64 361/679.21 |
| 7,689,197 B2* | 3/2010 | Laude | ................. | G11B 17/0405 455/344 |
| 8,047,489 B2* | 11/2011 | Watanabe | .............. | F16M 13/02 248/292.14 |
| 8,120,897 B2* | 2/2012 | VanDuyn | ................ | F16M 11/10 361/679.22 |
| D674,392 S * | 1/2013 | Cheng | .......................... | D14/434 |
| 8,780,547 B2* | 7/2014 | Nakanishi | .............. | G03B 29/00 361/679.41 |
| 10,095,268 B1* | 10/2018 | Adam | .................... | G06F 13/385 |
| 2003/0076302 A1* | 4/2003 | Langstraat | ............ | G06F 1/1626 345/161 |
| 2006/0050471 A1* | 3/2006 | Chen | ...................... | G06F 1/1601 361/679.22 |
| 2006/0061958 A1* | 3/2006 | Solomon | ................ | G06F 1/1632 361/679.43 |
| 2007/0127197 A1* | 6/2007 | Tae | ......................... | G06F 1/1626 361/679.27 |
| 2013/0107136 A1* | 5/2013 | Tamura | ..................... | H04N 5/64 348/836 |
| 2016/0061379 A1* | 3/2016 | Watanabe | .............. | F16M 11/10 224/191 |
| 2016/0246328 A1* | 8/2016 | Christie, II | ............ | F16M 13/02 |
| 2017/0023975 A1* | 1/2017 | Nalbandian | ........... | G06F 1/1626 |
| 2017/0227984 A1* | 8/2017 | Hill | .......................... | G06F 1/189 |

* cited by examiner

*Primary Examiner* — Anthony Q Edwards
(74) *Attorney, Agent, or Firm* — Brian J. Pangrle

(57) ABSTRACT

A device dock can include a support for a display device; a top side; a bottom side that includes one or more feet; a sloped front side; a sloped back side, where the sloped back side slopes in a direction outwardly away from the bottom side; and a wall mount operatively coupled to the sloped back side.

21 Claims, 19 Drawing Sheets

US 11,068,028 B1

DEVICE DOCK

TECHNICAL FIELD

Subject matter disclosed herein generally relates to docks for computing and display devices.

BACKGROUND

A device can include a housing with a display or housings coupled via one or more hinge assemblies where one or more of the housings can include a display.

SUMMARY

A device dock can include a support for a display device; a top side; a bottom side that includes one or more feet; a sloped front side; a sloped back side, where the sloped back side slopes in a direction outwardly away from the bottom side; and a wall mount operatively coupled to the sloped back side. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
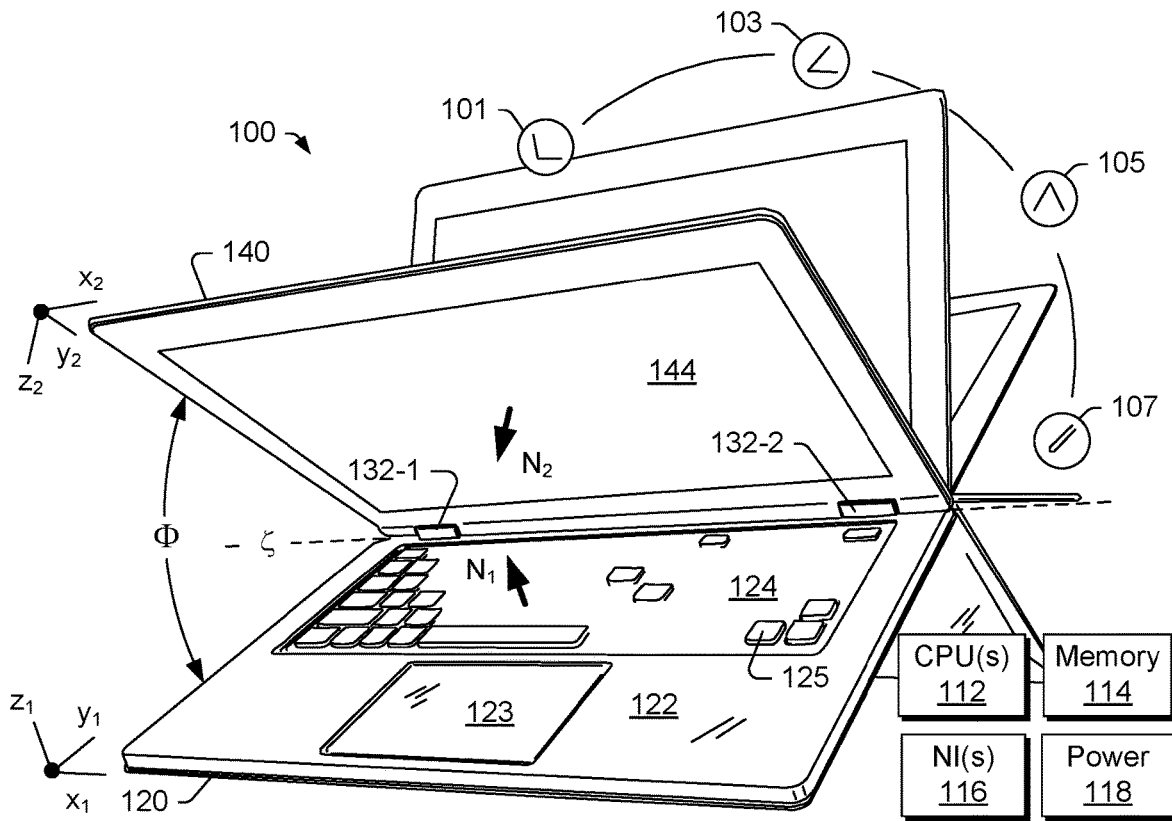
FIG. 1 is a series of diagrams of examples of devices.
Figure 1:
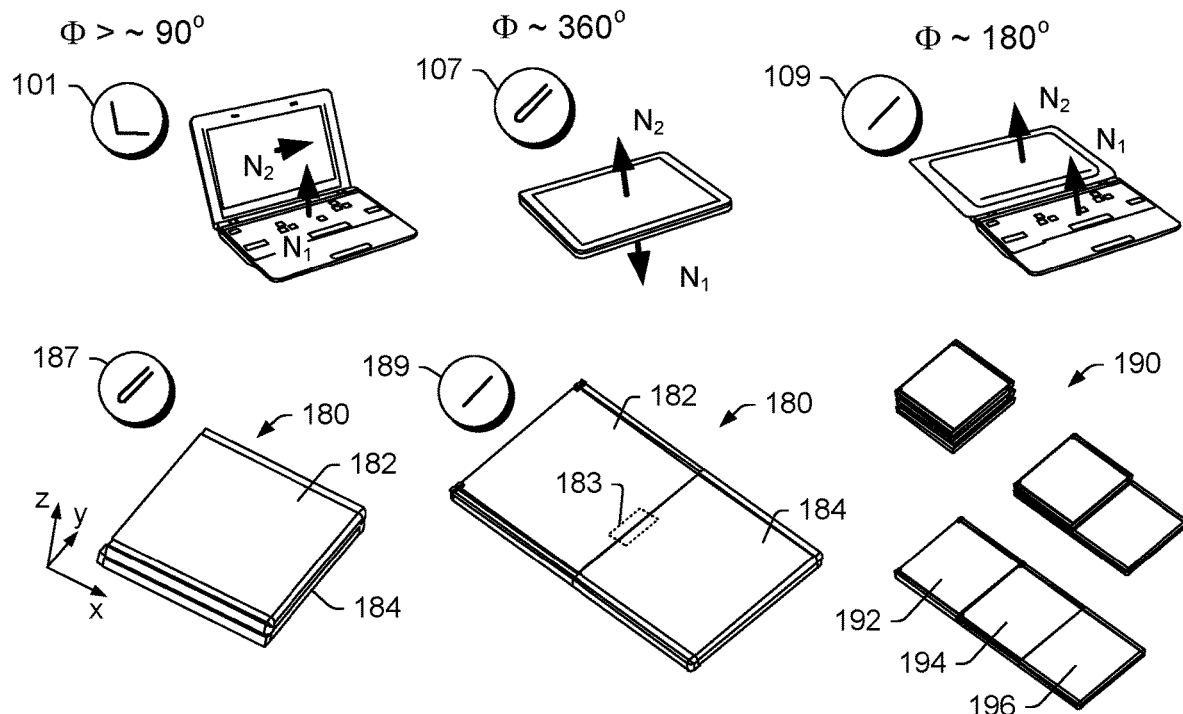

FIG. 1 shows an example of a system 100 that includes a keyboard housing 120 and a display housing 140 that are pivotable with respect to each other via movement about one or more hinges 132-1 and 132-2 (e.g., hinge assemblies). FIG. 1 also shows an example of a system 180 that includes a first housing 182 and a second housing 184 that are pivotable with respect to each other via movement about one or more hinges 183 and an example of a system 190 that includes a first housing 192, a second housing 194 and a third housing 196 that may be pivotable with respect to each other via movement about hinges.

As an example, the system 100, the system 180 and/or the system 190 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, the housing 182, the housing 184, the housing 182 and the housing 184, one or more of the housings 192, 194 and 196, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

As shown in FIG. 1, the system 180 can include a folded orientation 187 and a planar orientation 189. As an example, one or both of the housings 182 and 184 may include a display. As shown in FIG. 1, the system 190 can include various orientations, including, for example, a planar orientation of the three housings, a partially folded orientation and a folded orientation. As an example, a three housing system may be configurable in more than one folded orientation with respect to a "middle" housing. For example, the housings 192 and 196 may be folded with respect to the housing 194 with the housing 192 on the top side or bottom side or with the housing 196 on the top side or bottom side.

As explained with respect to FIG. 1, a computing device can include two or more displays. For example, a dual-screen computer can include a first touch-sensitive display and a second touch-sensitive display where each of the displays may be mounted to a respective housing where the housings are operatively coupled via one or more hinge assemblies.

As an example, a device dock or dock can be an accessory for one or more computing device, which may help to improve ergonomics and convenience, particularly with fast-paced, busy life styles. As an example, a device dock can be multi-functional and can extend functionality of a computing device. For example, consider making it easier to use a display device as a television in a room where the dock can be wall mounted and support the display device. Such an approach may allow a user to do without a conventional, permanently mounted television.

As an example, a dock can include a speaker and/or charging circuitry, for example, suitable for charging a portable device (e.g., a tablet, a multi-display device, a cell phone, etc.). As to charging circuitry, consider inductive charging circuitry such that a device may be supported by a dock without wired contacts. In such an approach, the device can come and go without inconvenience of having to align connectors, etc. As an example, pairing may occur automatically or semi-automatically with a dock that includes wireless communication circuitry, which may be circuitry capable of making a network connection.

As an example, a dock can be a stand (e.g., a physical support) for a display device, a wireless speaker and a wireless charge (e.g., an inductive charger). In such an example, the multiple functions of the dock may help to reduce clutter and optimize a user's space. As an example, a dock can itself be supported in different manners such as, for example, on a horizontal surface and on a vertical surface. In such an example, the dock can support a display device at two different angles where the angle of the vertical surface mount orientation can be more vertical than the horizontal surface mount orientation. Such an approach can make a dock more suited to multiple uses and, again, reduce clutter, etc.

As mentioned, a dock may be configured (e.g., shaped, sized, etc.) for placement on a surface (e.g., a shelf, a table, a desk, a counter, etc.) or hung on the wall. As an example, a dock can be configured to take up less table top space, improved ergonomics (e.g., straighter posture/user friendly) and strategic placement for a busy family such as close to a back kitchen door with high traffic (e.g., to address a user's particular demands, etc.).

As an example, a dock can have a form that is functional where it provides an optimal table top viewing angle and a different optimized wall mounted viewing angle. In such an example, the two angles may be achieved without moving a part or parts.

As an example, a dock can include one or more auto-sensing mechanisms. For example, consider an auto-sensing stand that extends when docking and retracts when not in use to reduce footprint for "cleaner" table top surface, etc.

As an example, a dock may be hung on a wall and include a pull cord that can function as a plug and can function as a switch to turn on and off floor and/or wall light located underneath the dock.

As an example, a dock can include a slide out foot that can provide the dock with greater display stability when using on a table top surface. For example, consider a foot that slides out automatically when placed on a surface. In such an example, mass of the dock may be sufficient to trigger transition of the foot. In such an example, a user may position the dock on a surface where transfer of weight causes the dock to extend the foot. Or, for example, consider a push mechanism where a user can apply a suitable amount of downward force to the dock such that it releases the foot. In such an example, the additional force (e.g., additional weight) can be sufficient to trigger a mechanism that extends the foot.

As an example, a dock can include various features such as, for example, to slide out a foot, slide in a foot, extend/retract a support, etc. In a retracted or slid-in state of a feature or features, a dock can have a "clean" minimal look. As an example, one or more of various features can be utilized in a retracted state, for example, to be utilized as a lamp, a wireless speaker, etc.

As an example, a device dock can be versatile such that it can extend functionality of a display device such as a multi-display in a relatively small footprint where various surfaces are functional (e.g., reduced unused negative space). As an example, a dock can include a top surface that includes a slot, a recess, etc., for a stylus. As an example, a dock can include a support that extends and retracts via a sensor, a touch, a push, etc. As an example, a dock can be shaped to sit on a table or fix to a wall where the dock can possess ergonomic features. As an example, a dock can include a slide out support and LED ambient lighting when hung on the wall (e.g., or supported on a table, a desk, a counter, etc.).

Figure 2:
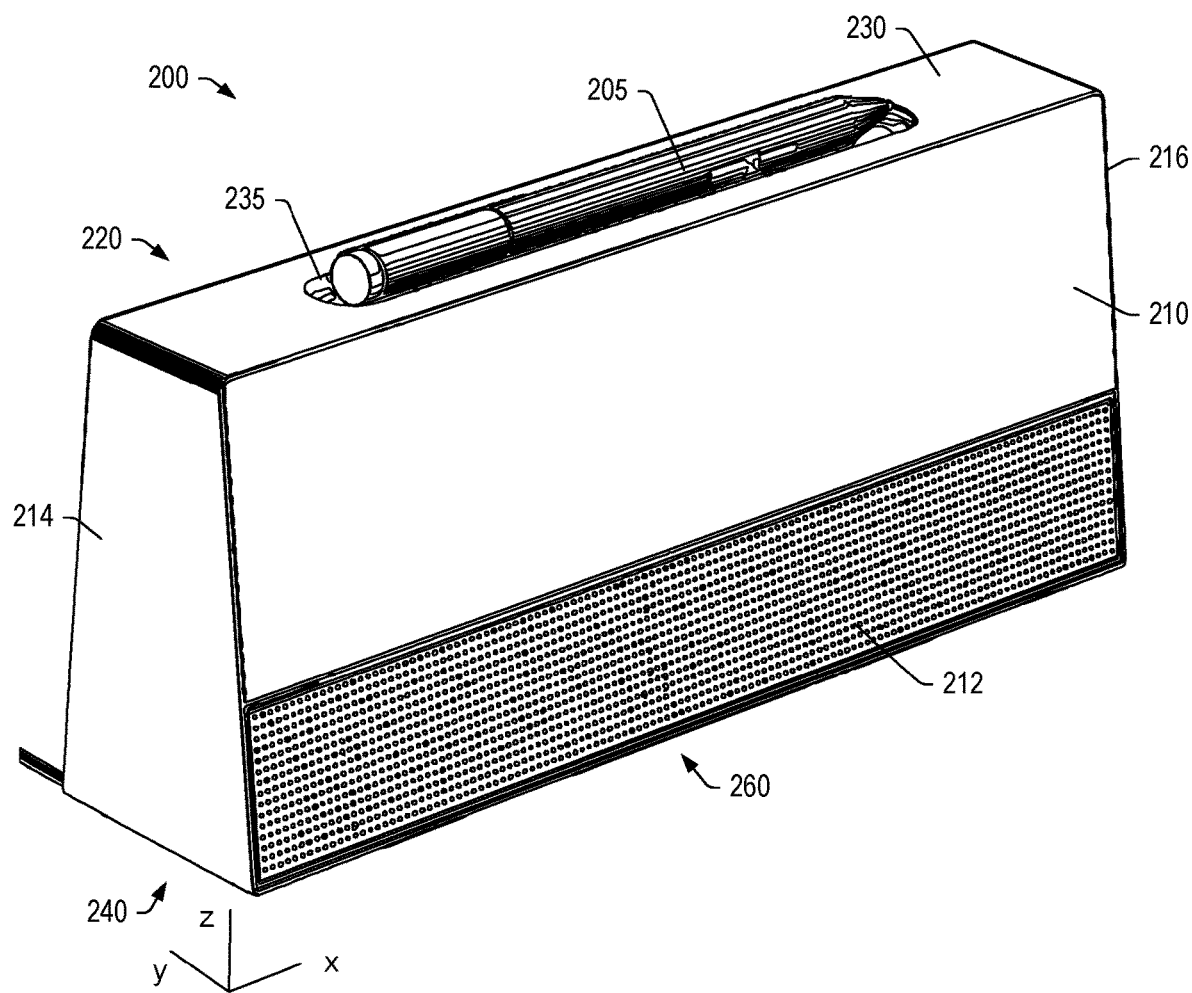
FIG. 2 is a perspective view of an example of a device dock.

FIG. 2 shows an example of a dock 200 (e.g., a device dock) with a support 260 in a retracted state. As shown, the dock 200 includes a front side 210 with a speaker grille 212, opposing sides 214 and 216, a back side 220, a top side 230 and a bottom side 240. As shown, the dock 200 can support a stylus 205, which may be positioned in a recess 235 of the top side 230.

In the example of FIG. 2, the support 260 can include a front side that is contiguous with the speaker grille 212. In such an example, the support 260 can be aesthetically hidden. For example, a user viewing the dock 200 may not discern that it includes a support. However, the dock 200 can include one or more indicia (e.g., arrow, marker, etc.) that can draw a user's attention to the presence of the support 260.

In the example of FIG. 2, the dock 200 can perform one or more functions. For example, the dock 200 can support and charge the stylus 205 where the dock 200 includes charging circuitry, which may be wireless or wired for charging a battery of the stylus 205. As another example, the dock 200 can be a wired and/or wireless speaker, where the dock 200 can include audio circuitry for receipt of audio signals and transmission to a speaker driver, which may be positioned to be in fluid communication with openings of the speaker grille 212. As an example, the dock 200 can be a light. For example, the dock 200 can include one or more LEDs such that the dock 200 can emit light. As an example, the dock 200 may include one or more status lights (e.g., status LEDs, etc.), which may indicate a state of circuitry (e.g., powered via cord, powered via battery, battery charge, wireless connection, wired connection, etc.). As to a light, the dock 200 may be configured to emit light via the bottom side 240 or, for example, a portion of the support 260 (e.g., when the support 260 is in an extended state).

As an example, the dock 200 can be a device dock that can include the support 260 for a display device; the top side 230; the bottom side 240 that can include one or more feet; the sloped front side 210; the sloped back side 220, where the sloped back side 220 slopes in a direction outwardly away from the bottom side 240; and a wall mount operatively coupled to the sloped back side 220. A wall mount may be one or more components, which may be included in the dock 200 and/or provided for coupling to the dock 200.

Figure 3:
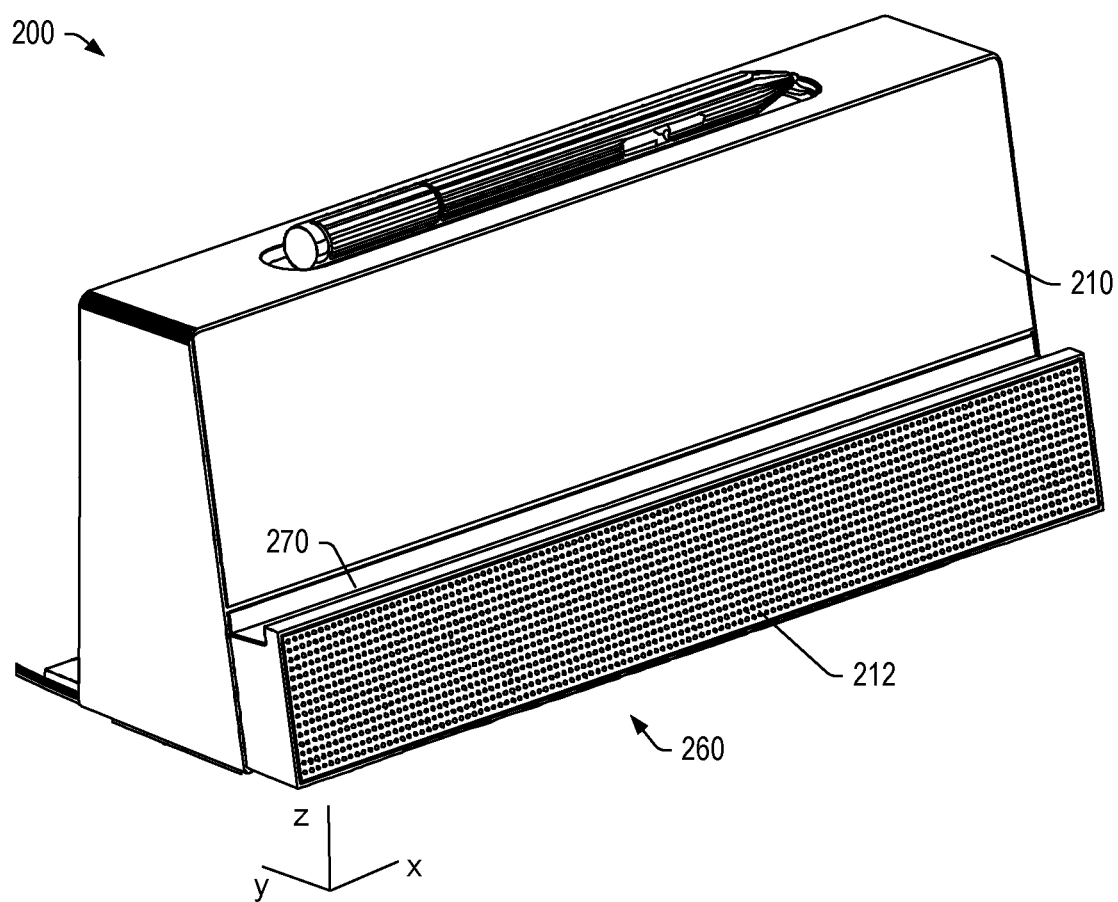
FIG. 3 is a perspective view of an example of a device dock with a support in an extended state.

FIG. 3 shows a perspective view of the example dock 200 with the support 260 in an extended state (e.g., a deployed state). As shown in the example of FIG. 3, the support 260 can include a groove 270 that can provide for support of a display device, which may be a multi-display device that may be a computing device. As an example, the support 260 can be transitioned from the retracted state to the extended state via one or more mechanisms. For example, consider a push to release mechanism that can include a lock and a spring where pushing the support 260 inwardly a small distance causes the lock to release and the spring causes the support 260 to extend at least partially outwardly. In such an example, the spring (e.g., or springs) can cause the support 260 to fully extend outwardly from the front side 210 of the dock 200 or, for example, the support 260 may extend to an extent that a user can contact the support 260 (e.g., a finger at the groove 270) to pull it fully to an extended state. As to retracting the support 260, a user may push the support 260 inwardly where the lock can relatch the support 260 to maintain it in the retracted state.

As an example, a dock can include an automatic release that is triggered by one or more signals, actions, etc. For example, consider an automatic release that is operatively coupled to wireless circuitry such as BLUETOOTH circuitry. In such an example, upon pairing, the support 260 can be released to move forward (e.g., where spring-loaded, mechanized, etc.). In such an example, proximity of a display device with BLUETOOTH circuitry active can trigger the dock 200 to release the support 260. As an example, the dock can include a remote control, which may be in the form of an app or a physical remote control. In such an example, the support 260 may be releasable via a signal from the remote control.

In the example of FIG. 3, the support 260 is shown to be a fraction of the front side surface, which can be composed of a support portion and a portion above the support 260 where the portion above the support 260 can be fixed in that it is an immobile surface of the dock 200 whereas the support portion moves with the support 260. Where the support 260 includes one or more speaker drivers, one or more of the one or more speaker drivers may move with the support 260 (e.g., housed within the support 260, etc.). For example, the dock 200 can include a speaker driver that is not part of the support 260 and/or a speaker driver that is part of the support 260. In such examples, the speaker grille 212 can provide for movement of air (e.g., sound waves).

As an example, the support 260 can include stand-alone circuitry such that the support 260 may be removable from the dock 200 and positioned remotely from the dock 200. As an example, the support 260 may include circuitry that can communicate with circuitry of the dock 200 when the support 260 is remote from the dock 200 (e.g., not in physical contact with the dock 200).

Figure 4:
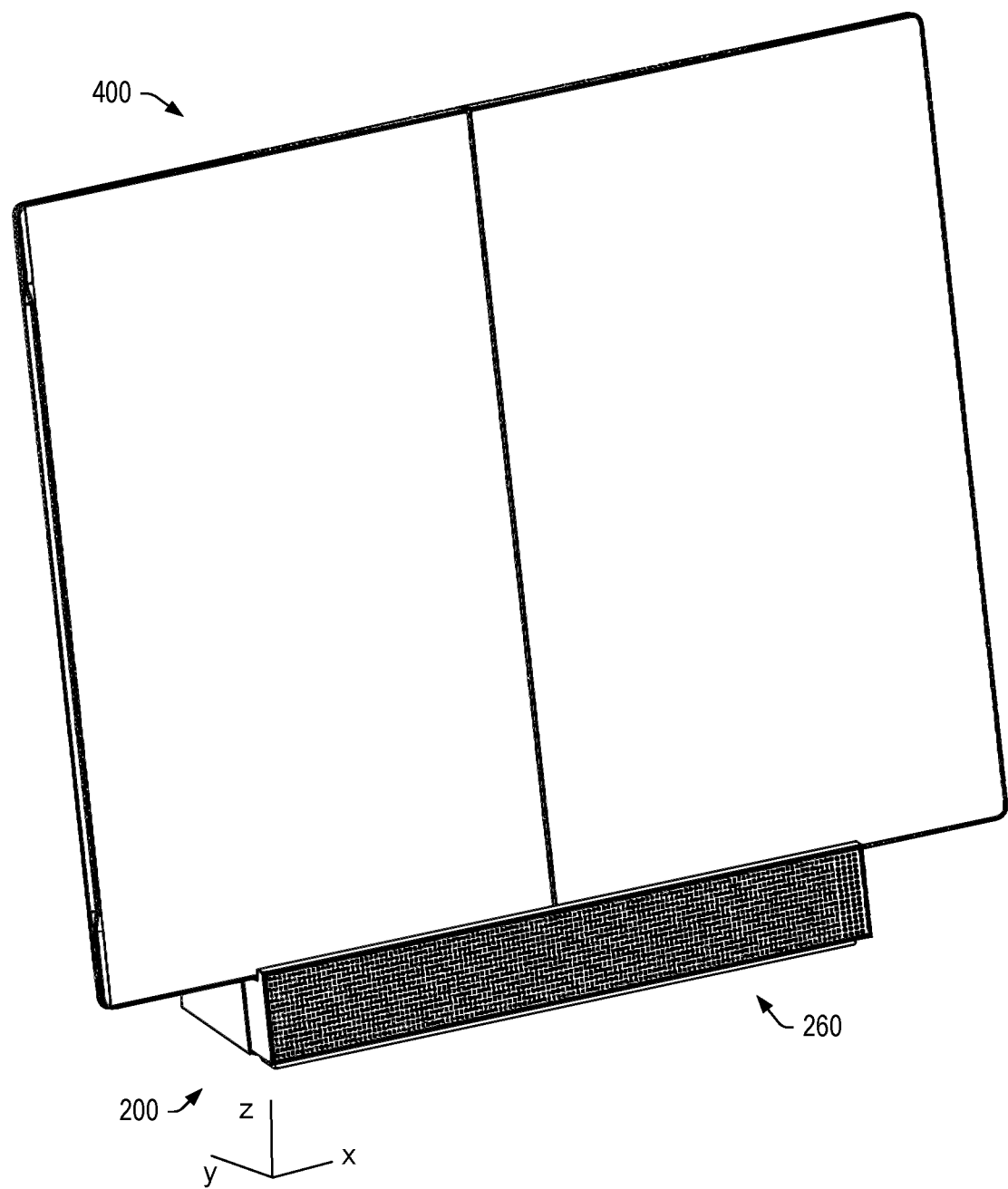
FIG. 4 is a perspective view of an example of a device dock supporting an example of a display device.

FIG. 4 shows the dock 200 with the support 260 in an extended state and supporting a display device 400, which can include two displays in a planar orientation (e.g., a flat orientation of 180 degrees). As shown, the speaker grille 212 can be at an angle that is approximately the same angle as the display device 400. In such an example, sound may be directional in a direction that may be a viewing direction such that a user can view imagery, etc., rendered to a display or displays of the display device 400 and can hear sound emitted by the dock 200; noting that such sound may be via audio signals transmitted from the display device 400 to the dock 200 (e.g., via wire, wirelessly, etc.).

As an example, the display device 400 and the dock 200 can include one or more of wireless communication circuitry, wired communication circuitry, wireless power circuitry, wired power circuitry, etc. As an example, the dock 200 can include a power connector for receipt of power, for example, via a power outlet, and/or can include one or more batteries (e.g., one or more lithium-ion rechargeable batteries, etc.). As to a power connector, the dock 200 can include a socket for a corded power connector (e.g., which may include a converter such as an AC/DC converter) and/or the dock 200 can include a wall power outlet connector, which may be sufficient to support the dock 200 when connected to a power outlet of a wall. As an example, the dock 200 can include a power connector that is specified according to one or more standards such that the dock 200 can be mounted to a receptacle such as an electrical box that may be recessed in a wall with an opening where the dock 200 mounts to the electrical box and covers the opening. For example, consider the dock 200 being mountable akin to a wall light fixture (e.g., a sconce, etc.). As mentioned, the dock 200 can be a light. In such an example, the dock 200 can be a sconce light. A sconce light can be a type of light fixture affixed to a wall in such a way that it can be supported on the wall without a structure (e.g., a stand) that extends from the sconce light to a floor.

As an example, the dock 200 can be an assistant device. For example, the dock 200 can include a microphone operatively coupled to network circuitry where voice commands can be utilized to formulate and issue instructions, which can be utilized locally by the dock 200 and/or which can be transmitted via one or more networks to one or more other devices. As an example, consider circuitry such as in the ALEXA system (Amazon, Seattle, Wash.), the GOOGLE ASSISTANT system (GOOGLE, Mountain View, Calif.), etc. As an example, where the dock 200 includes voice command capabilities, features such as a speaker, a light, etc., may be controlled using voice commands.

As an example, the dock 200 may include dual-band, dual-antenna 802.11 a/g/b/n Wi-Fi with MIMO, a multi-microphone array, BLUETOOTH circuitry, one or more audio signal outputs (e.g., for external speakers, etc.), a digital media processor (e.g., Texas Instruments DM3725 Digital Media Processor, etc.), memory (e.g., Micron MT46H64M32LFBQ 256 MB (16 Meg×32×4 Banks) LPDDR SDRAM, etc.), flash memory (e.g., Samsung KLM4G1FEPD 4 GB High Performance eMMC NAND Flash Memory), wireless circuitry (e.g., Qualcomm Atheros QCA6234 Integrated Dual-Band 2×2 802.11n+BLU-ETOOTH 4.0 SiP, etc.), power management circuitry (e.g., Texas Instruments TPS65910A1 Integrated Power Management IC, etc.), a digital to analog converter, an analog to digital converter, an LED driver (e.g., National Semiconductor LP55231 Programmable 9-Output LED Driver), a multi-channel ADC (e.g., Texas Instruments TLV320ADC3101 92 dB SNR Low-Power Stereo ADC), etc.

Figure 5:
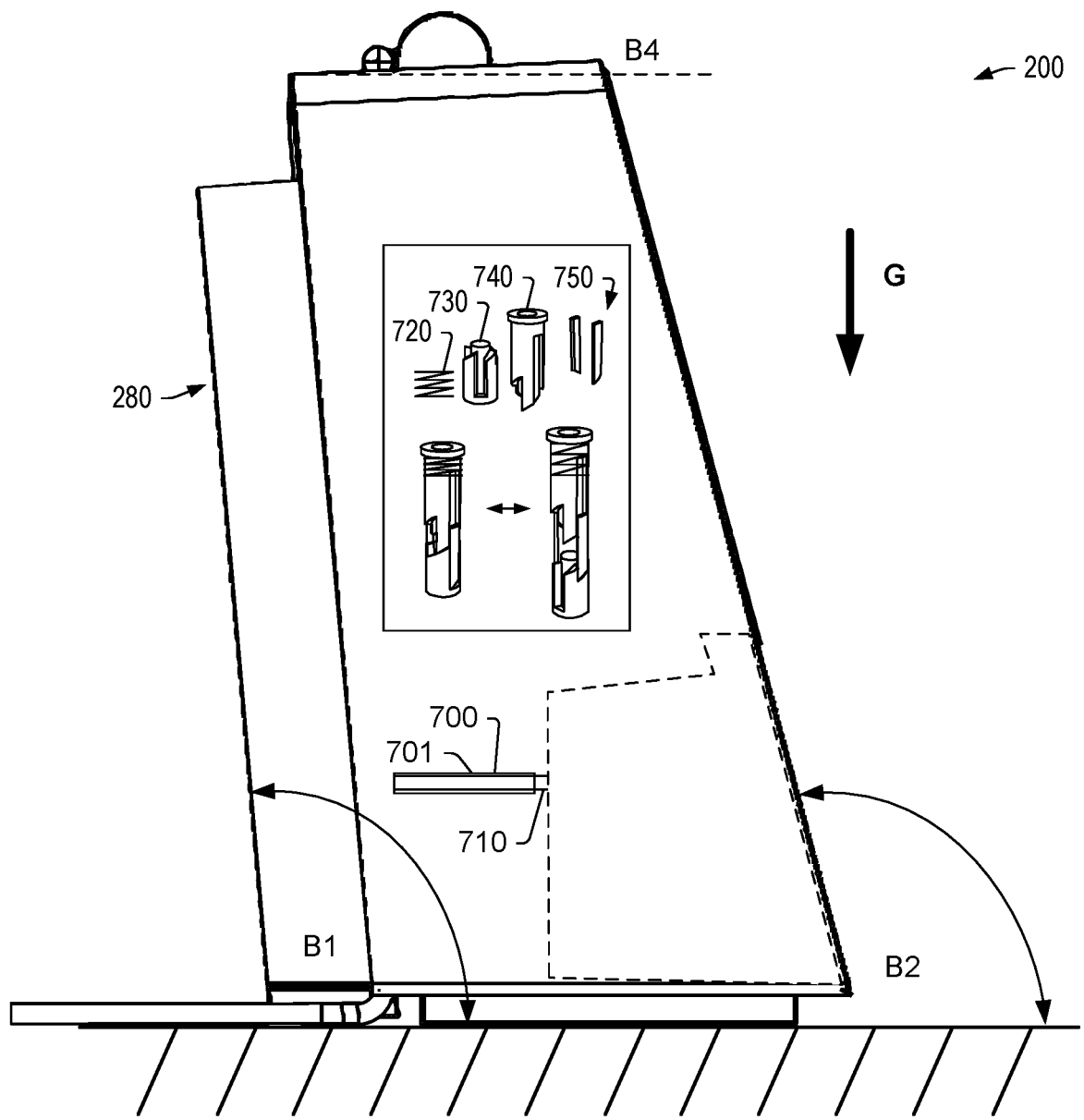
FIG. 5 is a side view of an example of a device dock.

FIG. 5 shows a side view of the dock 200 as including a mount 280. In the example of FIG. 5 various angles are shown, which include a back angle B1, a front angle B2, and a top angle B4. In the example of FIG. 5, the angle B1 can be approximately 95 degrees and the angle B2 can be approximately 115 degrees. As shown, the angle B1 can be determined at least in part via the mount 280, which can be operatively coupled to the dock 200 and may be part of the dock 200 (e.g., the dock 200 may include an integral mount).

In the example of FIG. 5, the dock 200 is supported on a flat, horizontal surface such that the mount 280 may be in a non-use state. As to the angles B1, B2 and B4, they may be referenced with respect to horizontal such as the flat, horizontal surface upon which the dock 200 is supported. As to the top side 230, it is at an angle of approximately 3 degrees, sloping downwardly toward the back side 220. As shown, the stylus 205 can be seated in the recess 235 where the angle of the top side 230 is insufficient to cause the stylus 205 to roll out of the recess 235 under the influence of gravity, which is indicated by an arrow and the letter "G".

As shown, the bottom side 240 can be sufficiently sized to support the dock 200 without the dock 200 tipping backwardly as it has a backward lean angle. As shown, the area of the bottom side 240 is greater than the area of the top side 230 (e.g., as in a plan view of those sides); noting that the bottom side 240 can include one or more feet that can contact a support surface (e.g., a tabletop, a desktop, a countertop, etc.). As an example, the area of the bottom side 240 can be referred to as a footprint area. In the view of FIG. 5, the side profile of the dock 200 is substantially polygonal with a greater slope in the front than in the back, where the bottom is horizontal and the top slightly sloped, noting that the top may be horizontal.

FIG. 5 also shows an example of a pop out mechanism 700, which can include a bore 701, a shaft 710, a spring 720 (e.g., or springs), a cam body 730, a plunger 740 and stop members 750. As an example, the pop out mechanism may be for a spring-biased pop out adjuster that can extend the support 260 to a position that facilitates further extension (e.g., for a finger grip, etc.) or that may fully extend the support 260. While the example of FIG. 5 shows the spring 720 to facilitate movement, one or more other springs may be included. For example, consider a spring or springs that may be at a surface to push the support 260 upon release (e.g., via a mechanical latch, etc.). As shown, the axial distance between the cam body 730 and the plunger 740 can change such that the shaft 710 can transition to an extended state responsive to pressure that cause the shaft 710 to first travel axially inwardly, for example, akin to the push button of a click pen; noting that fewer features may be suitable as the push button actions is replicated for pop out of the charger panel 250 (e.g., no pen tip extension, retraction is required as in the click pen). As an example, a pop out mechanism that includes features such as a pop out mechanism for cabinets and/or drawer doors may be utilized. As an example, as to the pop out mechanism 700, the plunger 740 can be in a state with the spring 720 compressed where further compression causes the cam body 730 to rotate with respect to the plunger 740. As an example, the cam body 730 can be supported by a spring that causes contact of the cam body 730 with the plunger 740 and/or the stop members 750. As an example, the shaft 710 and the plunger 740 may be separate components or a unitary piece. As an example, a foot (see, e.g., the foot 245) and/or one or more other features of a dock may be operable at least in part via a pop out mechanism. As mentioned, weight of the dock and/or weight applied to the dock may cause activation of one or more pop out mechanisms.

Figure 6:
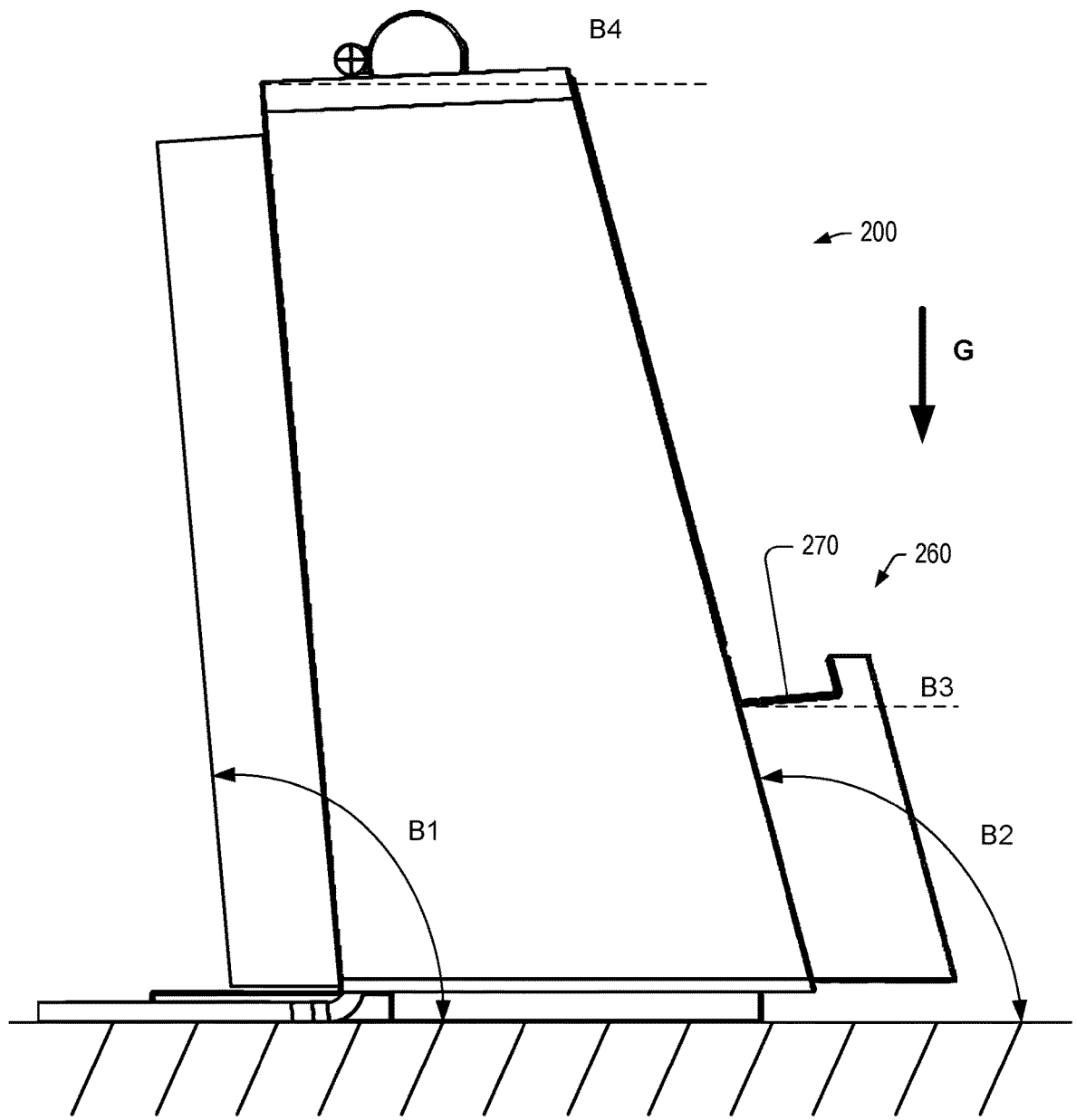
FIG. 6 is a side view of an example of a device dock with a support in an extended state.

FIG. 6 shows the example dock 200 of FIG. 5 with the support 260 in an extended state. As shown, the front side of the support 260 can be disposed at approximately the same angle as in the retracted state. FIG. 6 shows an additional angle, B3, which corresponds to a surface of the groove 270. As shown, the angle B3 may be approximately 5 degrees and sloped downwardly toward the back. As an example, the angle B3 can be greater than zero degrees and sloped downwardly toward the back.

As an example, the groove 270 can be sufficiently deep to receive the stylus 205 such that the stylus 205 may be stored internally in the dock 200 when the support 260 is in a retracted state. Such an approach may provide for moving of the dock 200 and the stylus 205 as an assembly, for example, when transitioning the dock 200 from being positioned on a horizontal surface to being positioned on a vertical surface (e.g., hung on a vertical surface, etc.).

In the example of FIG. 6, as the support 260 extends outwardly, forwardly away from the front side 210, the center of gravity of the dock 200 can be shifted forwardly as well. As mentioned, the dock 200 can have a backward lean. In the extracted state (e.g., deployed state) of the support 260, the forward positioning of the support 260 can help shift the center of gravity of the dock 200 in a manner that helps to counter act the backward lean. As to the mount 280, it may be of a relatively low mass. For example, consider the mount 280 being formed by stamping sheet metal, injection molding of polymeric material, etc., such that the mount 280 has sufficient structural integrity with a lattice type of structure that helps to reduce its overall mass. In such an example, the mount 280 being at the back side 220 of the dock 200 may be limited in its contribution to the overall mass of the dock 200 and shifting of the center of gravity of the dock 200 backwards (e.g., in a direction of the backward lean). As mentioned, the mount 280 may be retractable and, for example, it may be triggered for release (e.g., extension) via one or more mechanisms. For example, consider a pop out mechanism where a user pushes a button, a portion of the mount, etc., where a spring or springs cause the mount 280 to extend.

As mentioned, the support 260 can shift the center of gravity forwardly when the support 260 is in an extended state. Further, the groove 270 is positioned forwardly where the groove 270 can be utilized to support a display device, for example, the display device 400 as shown in the example of FIG. 4. Thus, the dock 200 can have a compact state with the support 260 retracted where the compact state does not include a groove suitable for support of a display device such as the display device 400 and, when support of such a device is desired, the support 260 can be extended forwardly to expose the groove 270, where a device can be seated at least in part in the groove 270 to position the device fore of the portion of the front side 210 of the dock 200 that is above the speaker grille 212 (e.g., the front side of the support 260).

As explained, the dock 200 can include various features that provide for stability, particularly where the support 260 is in an extended state.

Figure 7:
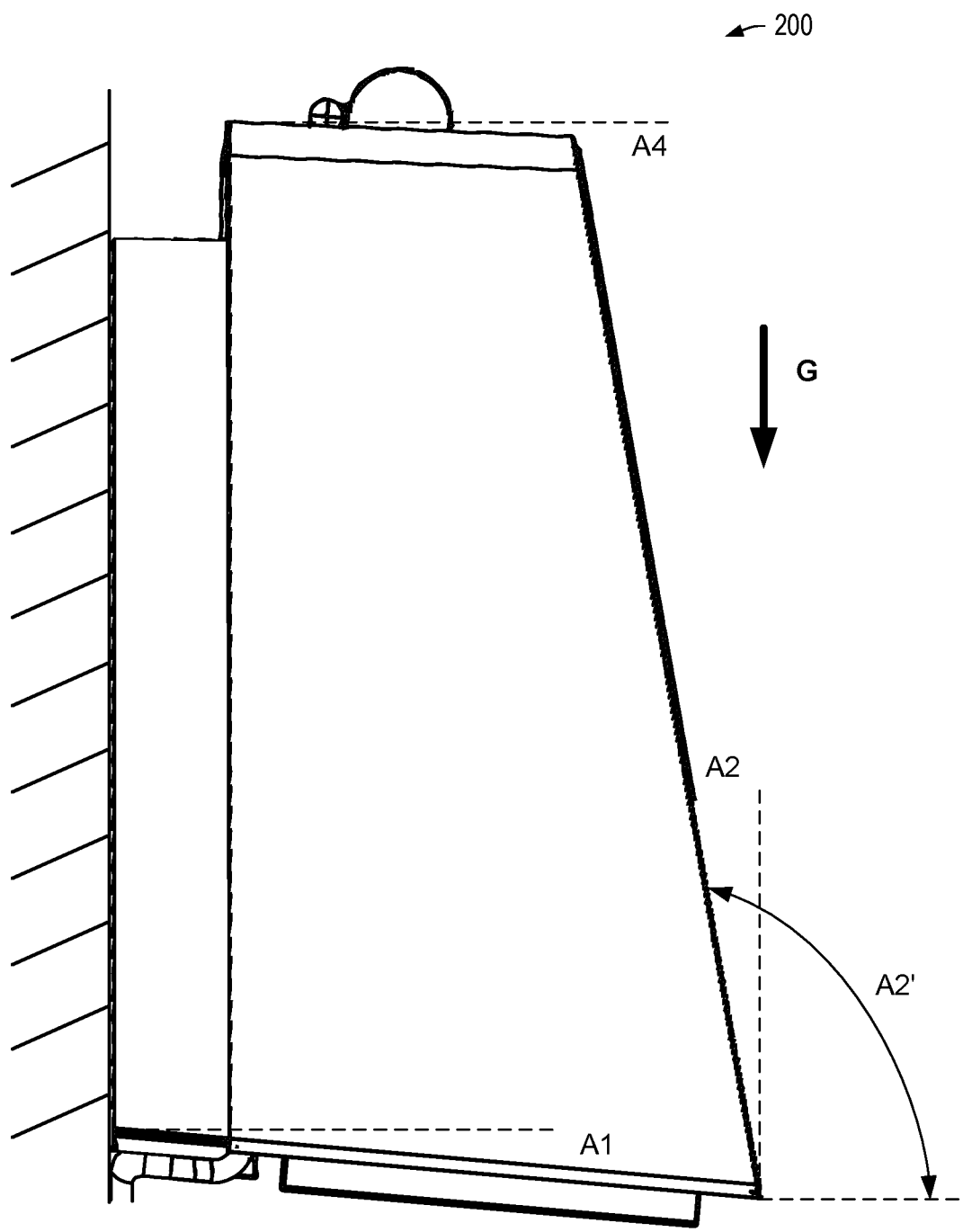
FIG. 7 is a side view of an example of a device dock mounted to a vertical wall.

FIG. 7 shows a side view of the device 200 in a wall mounted state where the back side 220 is substantially parallel to the wall (e.g., a vertical wall). In the example of FIG. 7, various angles are shown, including angles A1, A2, A2' and A3. As shown, the angle A1 can be approximately minus 3 degrees with respect to horizontal (e.g., sloping downwardly toward the front), the angle A2 can be approximately 10 degrees with respect to vertical (e.g., A2' can be approximately 100 degrees with respect to horizontal), and the angle A4 can be approximately minus 2 degrees with respect to horizontal (e.g., sloping downwardly toward the front). As shown, the top side 230 can include the recess 235 to seat the stylus 205 such that it does not roll off the top side 230 when seated in the recess 235 (e.g., due to gravity).

As explained, where the dock 200 is supported on a horizontal surface, it can have a backward lean; whereas, when supported on a vertical surface, the dock 200 can have an approximately no backward lean as the back side 220 can be oriented approximately vertically (e.g., substantially parallel to a vertical wall).

Figure 8:
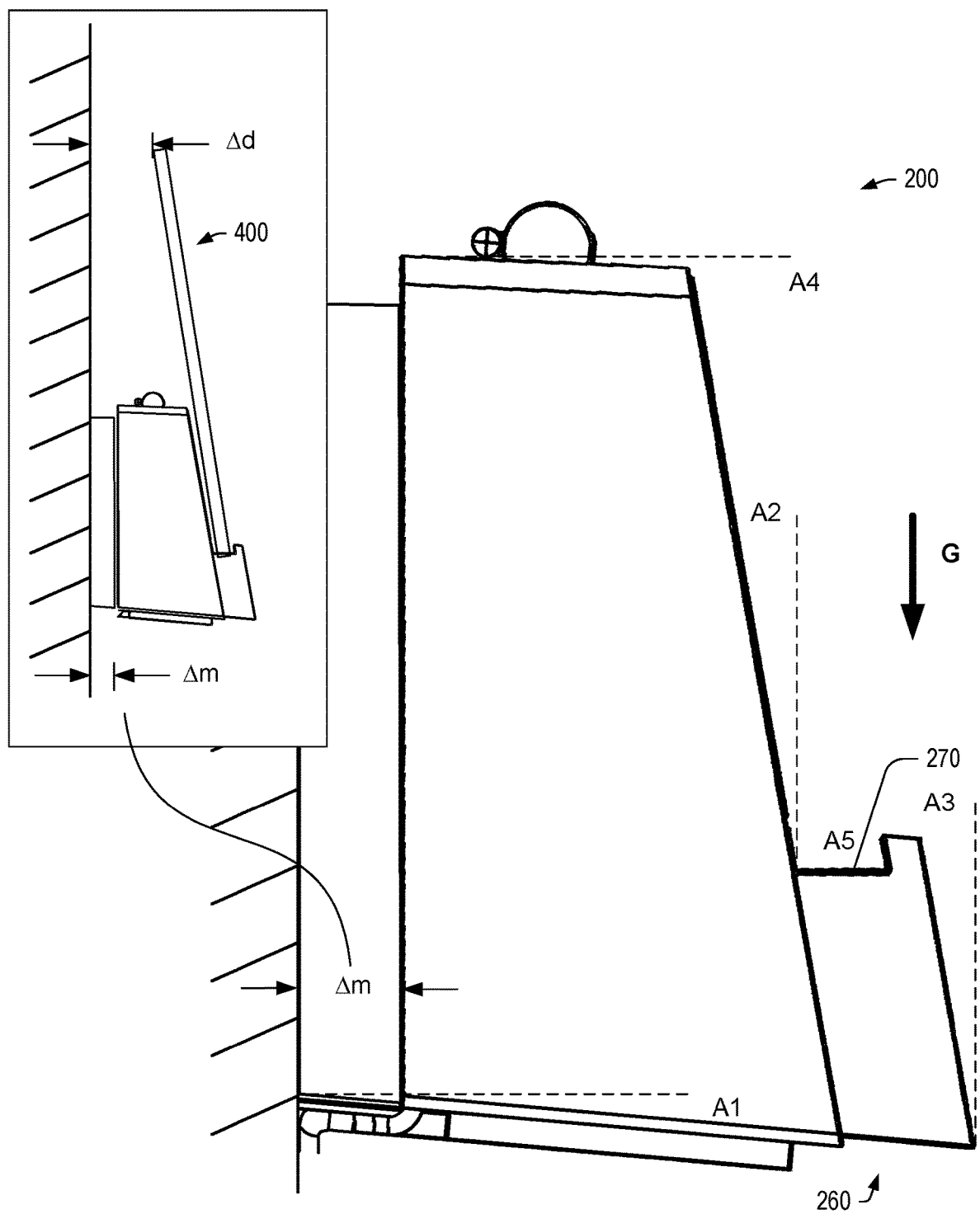
FIG. 8 is a side view of an example of a device dock mounted to a vertical wall with a support in an extended state.

FIG. 8 shows the dock 200 of the example of FIG. 7 where the support 260 is in an extended state that exposes the groove 270. In the example of FIG. 8, various angles are shown, including an angle A3 and an angle A5. As shown, the angle A3 can be the same as the angle A2 while the angle A5 may be for a surface of the groove 270, which can be approximately 0 degrees. In such an example, where a device is supported at least in part in the groove 270, the surface of the groove 270 does not act to tip the device forwardly. As an example, the surface may have a slope that is downwardly toward the back side 220 of the dock 200 where such a slope may help to tilt a device backwardly such that a surface of the device contacts the portion of the front side 210 of the dock 200 that is above the front side of the support 260 (e.g., above the speaker grille 212).

In the example of FIG. 8, a side view is shown with the display device 400 positioned using the dock 200 where a mount distance Δm is shown with respect to a display device to wall distance Δd. As an example, a mount or mounting features can be adjustable or may be fixed. To accommodate a particular size display device in a particular orientation, a mount may be selected and/or adjusted to provide for suitable clearance at the top of the display device and a wall surface such that the display device does not contact the wall, which may mark the wall surface (e.g., paint) and/or damage the display device (e.g., brick, stone, etc.).

As an example, a mount or mounting features may be retractable and recess into a back side of a dock. For example, consider rods that can be in rod sockets, optionally with friction fitting where the rods can be extended, optionally in unison. Or, for example, consider one or more plates, which may be extended from a back side of a dock a particular distance, which may be fixed or adjustable. As an example, one or more plates may be fit with one or more rods for purposes of retraction and extension.

As an example, a dock can include or be fit with a separate wall-mounting bracket. In such an example, consider a bracket with a specifically calculated depth in order to float the dock off of the wall at the appropriate distance (see, e.g., Δm) such that the display device will not lean back to touch the wall when set on the dock (see, e.g., Δd, which may be a clearance distance).

Figure 9:
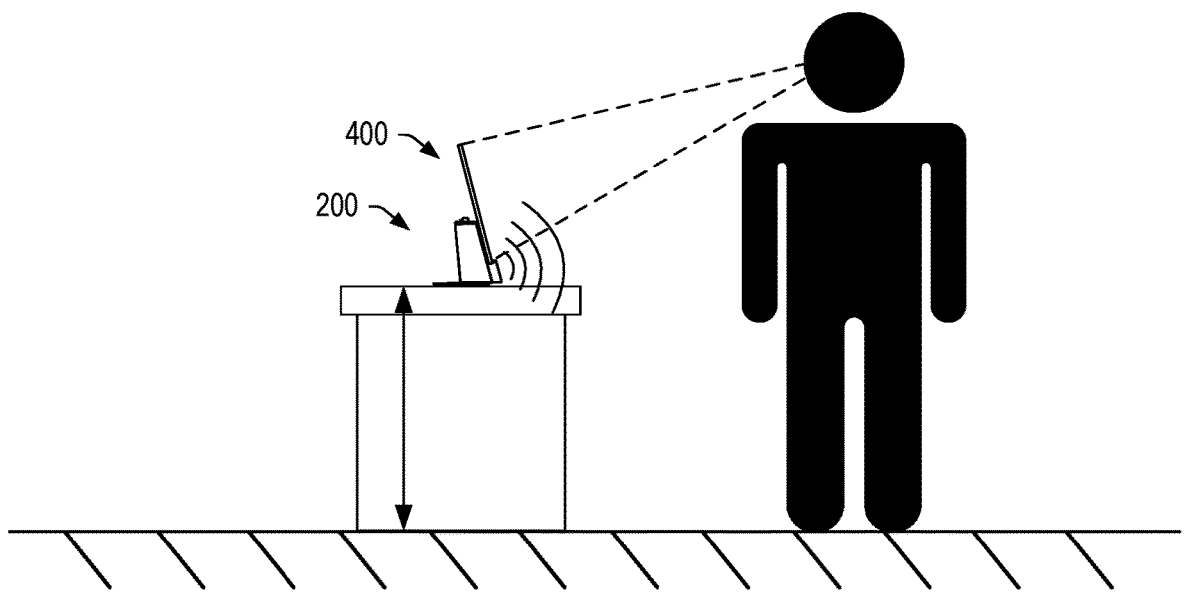
FIG. 9 is a side view of an example of a device dock supported horizontally on a support surface and a side view of an example of a device dock supported on a vertical wall.
Figure 9:
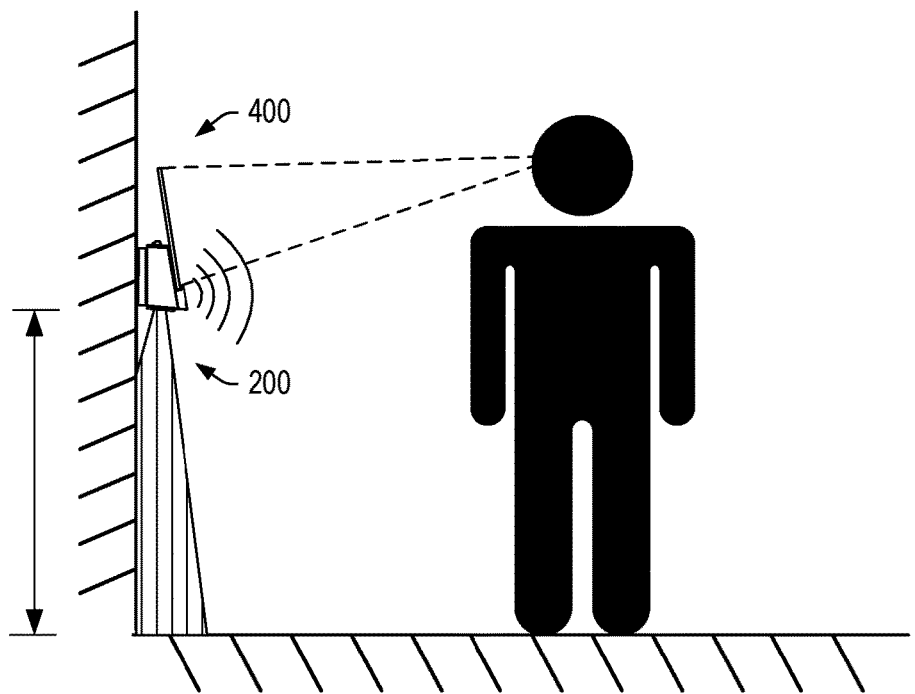

FIG. 9 shows the dock 200 with the display device 400 where the dock 200 is supported on a horizontal surface and where the dock 200 is supported on a vertical surface. As shown, the horizontal surface is at a lesser height than the height at which the dock 200 is mounted to the vertical surface (e.g., a vertical wall). As shown, a user can view the display device 400 in both orientations where, the relative forward rotation of the vertical surface mount of the dock 200, provides for an improved viewing angle in that orientation and where, the relative backward rotation of the bottom side 240 support of the dock 200, provides for an improved viewing angle in that orientation.

As shown, the dock 200 can include a light that is directed outwardly away from the bottom side 240. As shown, for the wall mounted orientation, the bottom side 240 is sloped such that the light source may be somewhat hidden by a lower portion of the front side 210 of the dock 200 and more so hidden when the support 260 is extended outwardly. For example, from the point of view of the user illustrated in FIG. 9, the user may see light emitted from the dock 200 without seeing the source of the light, which may be bright and cause undesirable glare. Where the light is illuminated in the horizontal mount orientation, the light may cause a glow about the bottom side 240 of the dock 200. As explained, light can be used to signal. For example, consider a mechanism as in a voice assistant where brightness, color, flashing, dimming, etc., can be utilized as one or more signals.

Figure 10:
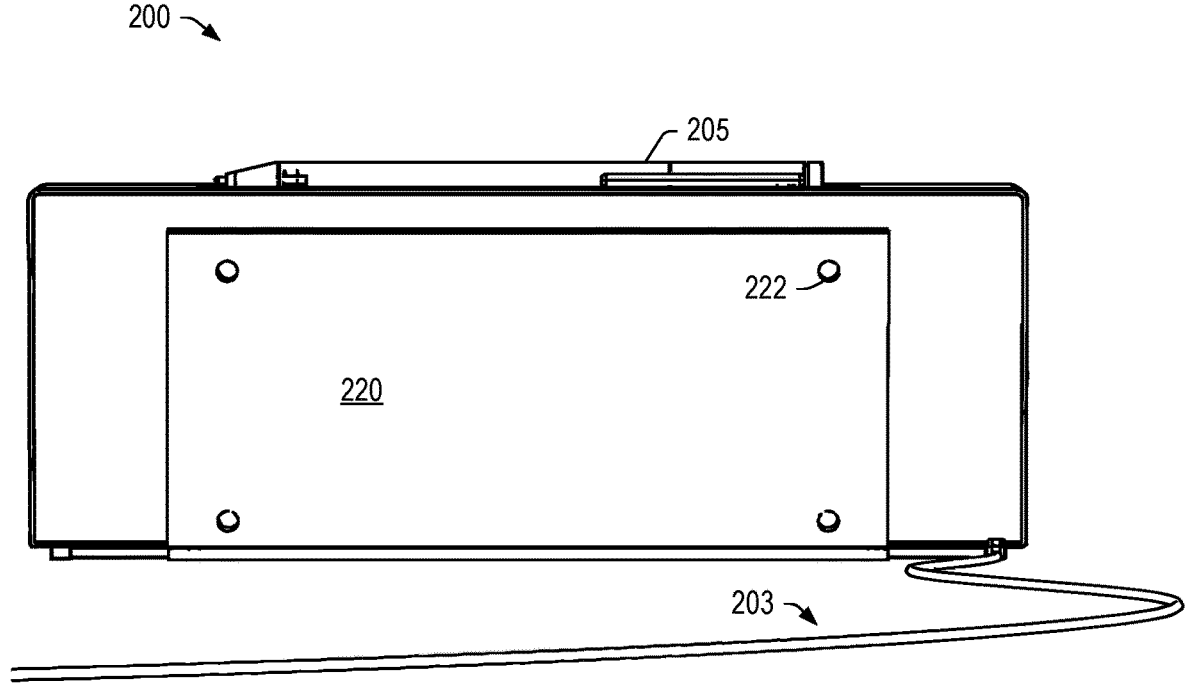
FIG. 10 is a back view of an example of a device dock.

FIG. 10 shows a back view of the dock 200, which shows various features 222, as well as a cord 203 that extends from the dock 200. The features 222 can include one or more features suitable for wall mounting of the dock 200. For example, the features 222 can include one or more openings that can receive a head of a pin, a nail, a screw, a bolt, etc., that may extend from a wall, an electrical box in a wall, etc. While the example of FIG. 10 shows the cord 203, as mentioned, a dock can include features such as a plug that can be received in a wall outlet, sconce fixture types of features for direct mounting to an electrical box, etc. As an example, consider a fireplace of a home that includes an electrical box above the fireplace, which may normally be utilized for plugging in a television. In such an example, the dock 200 may be fit to the wall using the electrical box, directly or indirectly via a plug that fits into an outlet. In such an example, the dock 200 can be utilized to support a display device, which may function as a television (e.g., via an antenna, a cable, wireless circuitry, etc.). In such an example, the dock 200 can be part of a replacement to a television or television system that is wall mounted and, for example, above a fireplace.

As an example, a dock can be rated to withstand temperatures that may be greater than those of a television. In such an example, the dock can selectively support a display device, where the display device may be removed when the temperature rises to a level that may cause some damage to the display device. When a fireplace is not in use, the dock can be used to support a display device, which may be at a position that is more viewer friendly than a TV fixed to a wall at a height that is to reduce its exposure to heat energy from the fireplace. When the fireplace is in use, if the temperature is deemed too high for the display device, the user may simply remove it from the dock and, for example, push in the support of the dock, which can help to consolidate the volume of the dock, which may reduce its exposure to heat energy from the fireplace.

As an example, in FIG. 10, a wall mounted orientation (e.g., vertical wall) may provide a tilt angle and a horizontally supported orientation may provide a different tilt angle. In such examples, the tilt angle as measured from vertical of a front side of the device dock may differ by approximately 2 degrees to approximately 15 degrees, by approximately 2 degrees to approximately 10 degrees, or, for example, may differ and differ by less than approximately 10 degrees. As an example, the tilt angle may be approximately 10 degrees when a device dock is wall mounted on a vertical wall and be approximately 15 degrees when the device dock is supported on a horizontal surface.

Figure 11:
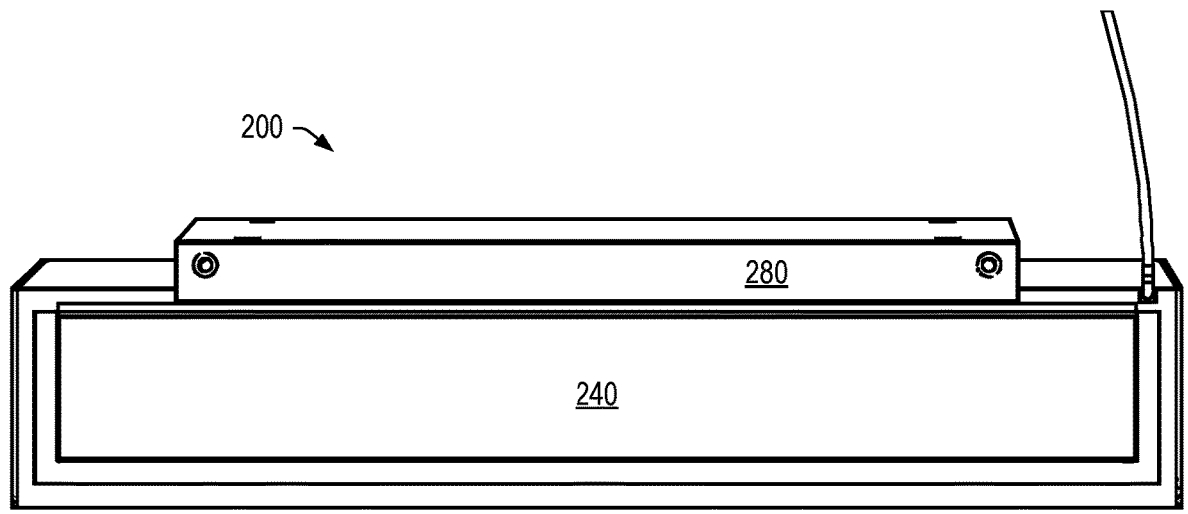
FIG. 11 is a bottom view of an example of a device dock.

FIG. 11 shows a bottom view of the dock 200, which shows the bottom side 240. In the example of FIG. 11, the mount 280 is visible and can include features along the bottom, which may be additional mounting features.

Figure 12:
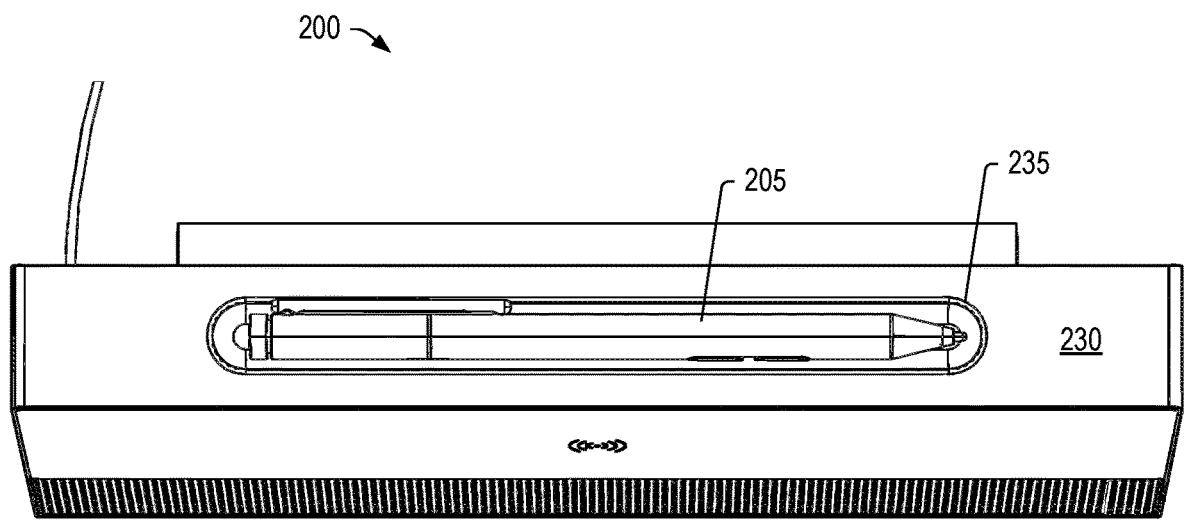
FIG. 12 is a top view of an example of a device dock.

FIG. 12 shows a top view of the dock 200, which shows the top side 230, the recess 235 and the stylus 205.

Figure 13:
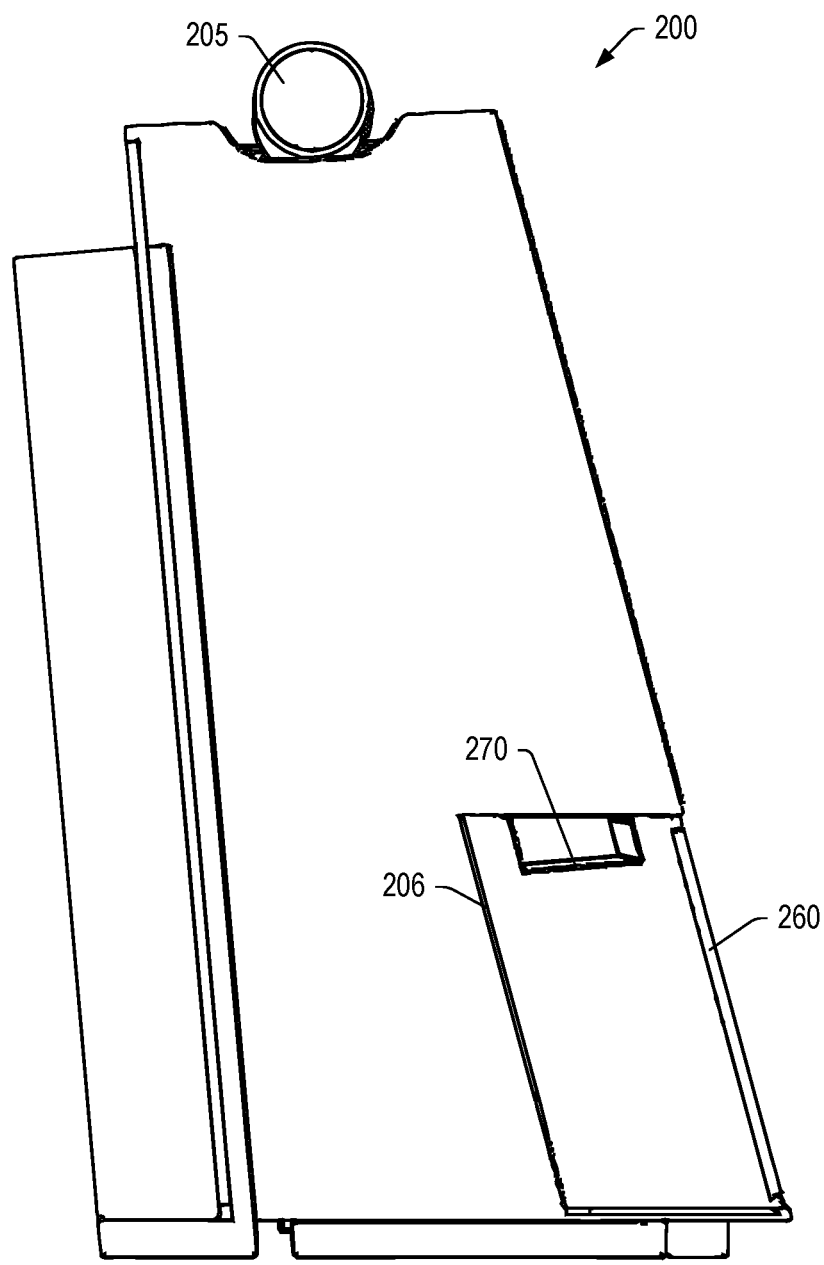
FIG. 13 is an approximate cross-sectional view of an example of a device dock with a support in a retracted state.

FIG. 13 shows an approximate cross-sectional view of the dock 200, where a recess 206 for the support 260 is visible. As shown, the support 260 can include the groove 270, which may be larger where, for example, it can accommodate the stylus 205.

Figure 14:
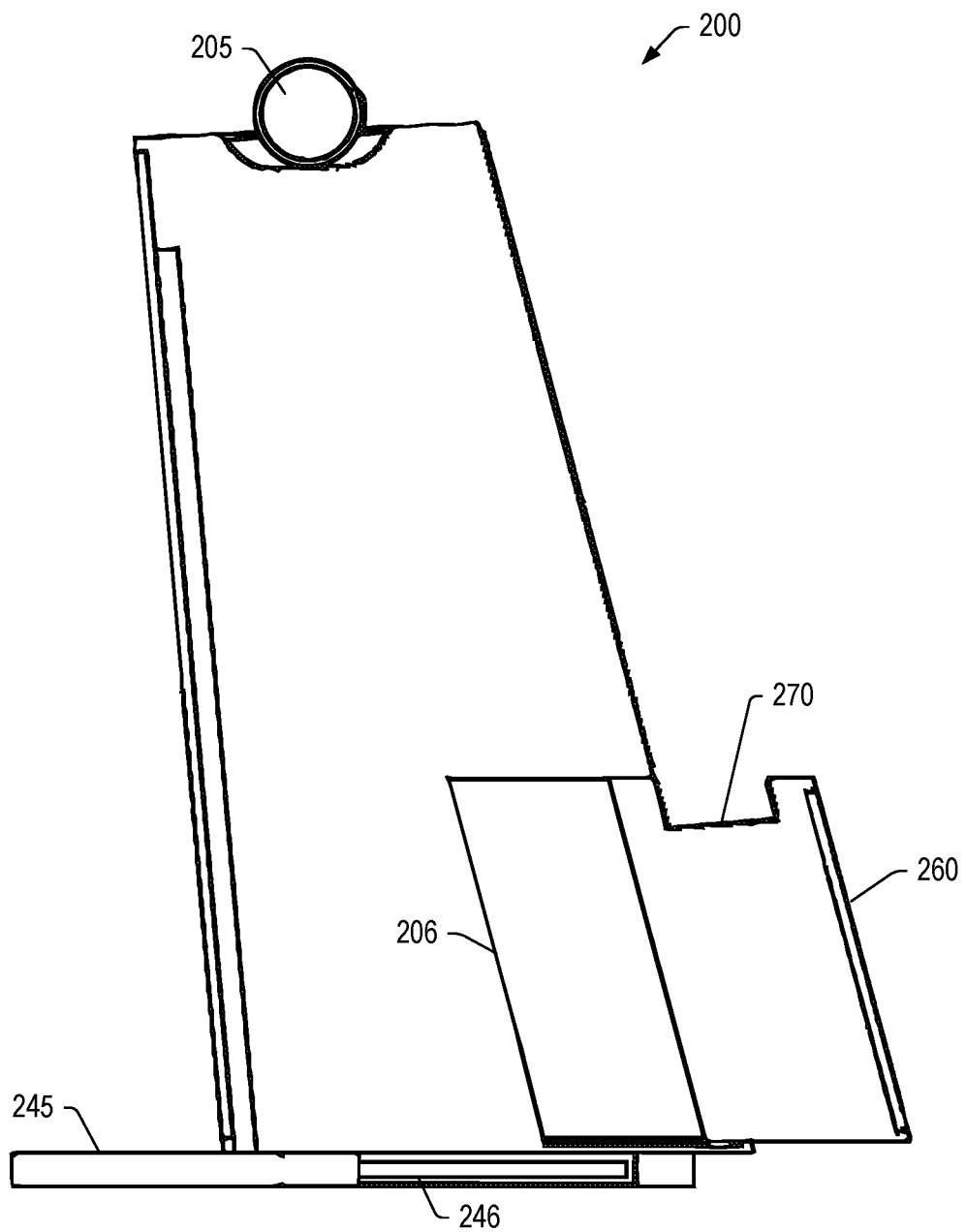
FIG. 14 is an approximate cross-sectional view of an example of a device dock with a support in an extended state and a retractable foot in an extended state.

FIG. 14 shows an approximate cross-sectional view of the dock 200, where the recess 206 for the support 260 is visible. As shown, the support 260 is in an extended state that exposes the groove 270. FIG. 14 also shows the dock 200 as including a retractable foot 245 that can be retracted into a foot recess 246. In such an example, the retractable foot 245 can be extended outwardly away from the back side 220 to increase a footprint of the dock 200, which may help to support a device received in part by the groove 270 of the support 260. As an example, the retractable foot 245 can be extendable manually, for example, to improve stability of the dock 200 on a horizontal surface. As an example, the retractable foot 245 may extend automatically responsive to actuation of an extension mechanism of the support 260. For example, when the support 260 extends outwardly in a front direction, the retractable foot 245 can extend outwardly in a back direction (e.g., a rear direction). In such an example, the dock 200 can become physically more stable for supporting a display device. As an example, the retractable foot 245 can be spring biased where, for example, if the dock 200 is mounted to a vertical wall, the retractable foot 245 is biased against the vertical wall such that it may not fully extend. As an example, the retractable foot 245 may be transitioned manually from an extended state to a retracted state where the support 260 is in an extended state. As an example, a wall mount may cover a portion of a retractable foot such that upon transitioning a support from a retracted to an extended state, the retractable foot remains substantially in a retracted state.

Figure 15:
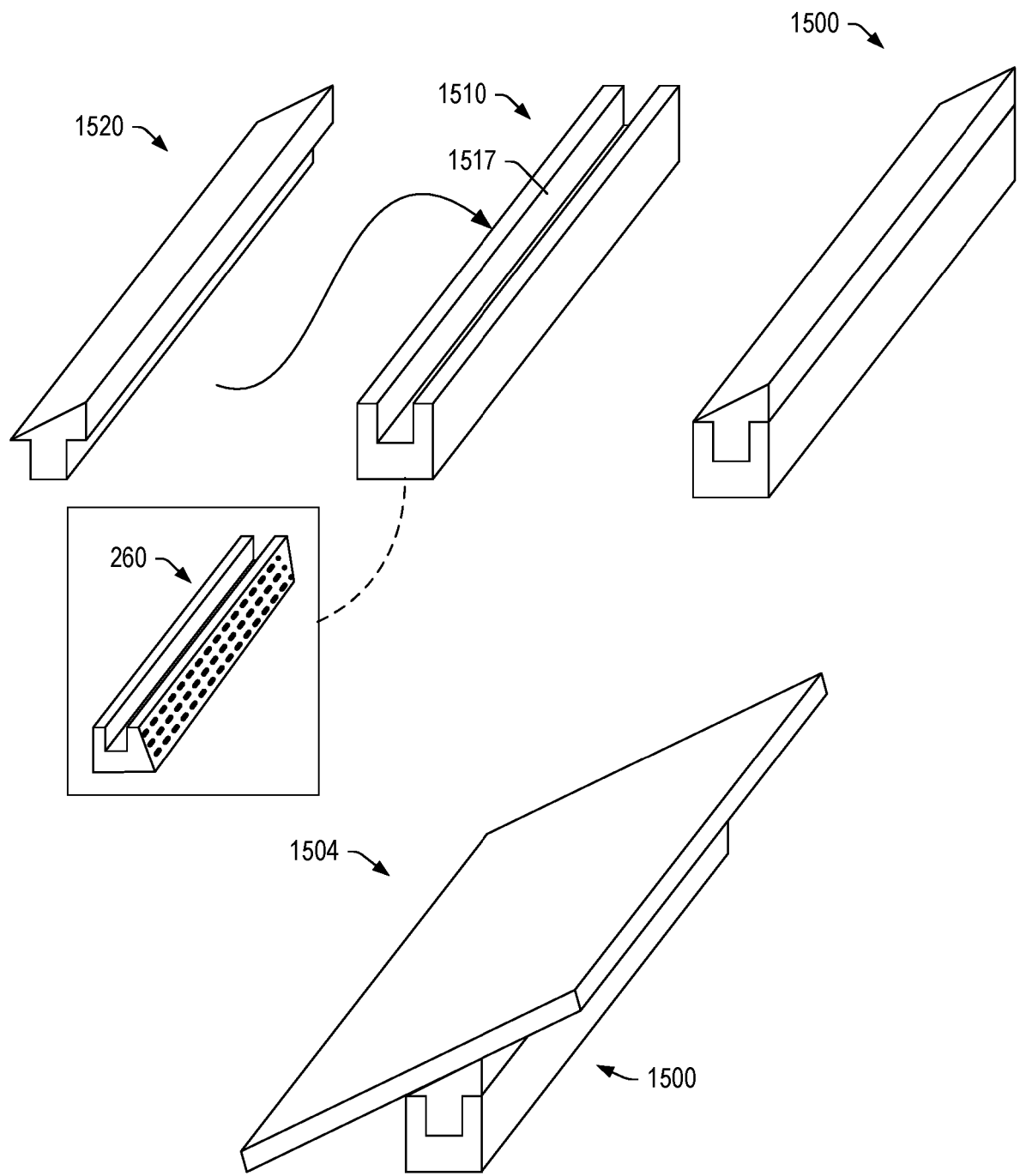
FIG. 15 is a series of perspective views of an example of an assembly.

FIG. 15 shows an example of an assembly 1500 that includes a dock 1510 with a groove 1517. As shown, the dock 1510 can receive an accessory 1520, which may be shaped for receipt by the groove 1517 such that the assembly 1500 can support a display device 1504.

As an example, the dock 1510 can be a support such as the support 260 of the dock 200. For example, the support 260 can be removable from the dock 200 to form its own dock and optionally an assembly with one or more components. As an example, the dock 200 may be an assembly that can receive the dock 1510 as the support 260 such that the dock 200 can be an accessory for the dock 1510.

Figure 16:
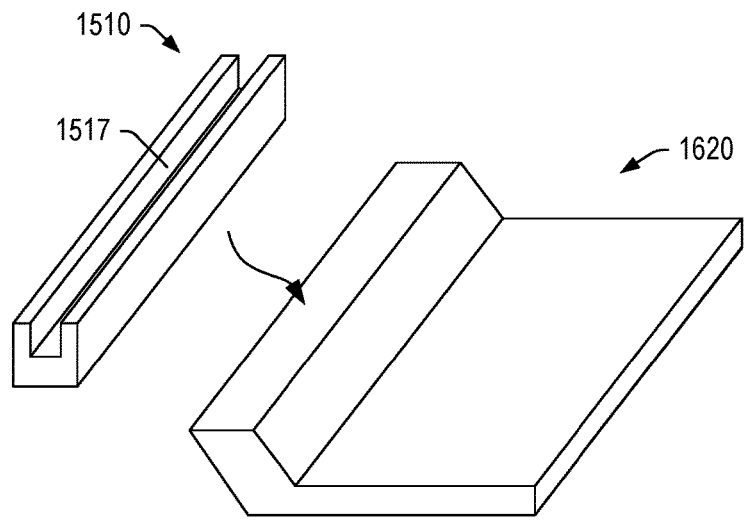
FIG. 16 is a series of perspective views of an example of an assembly.
Figure 16:
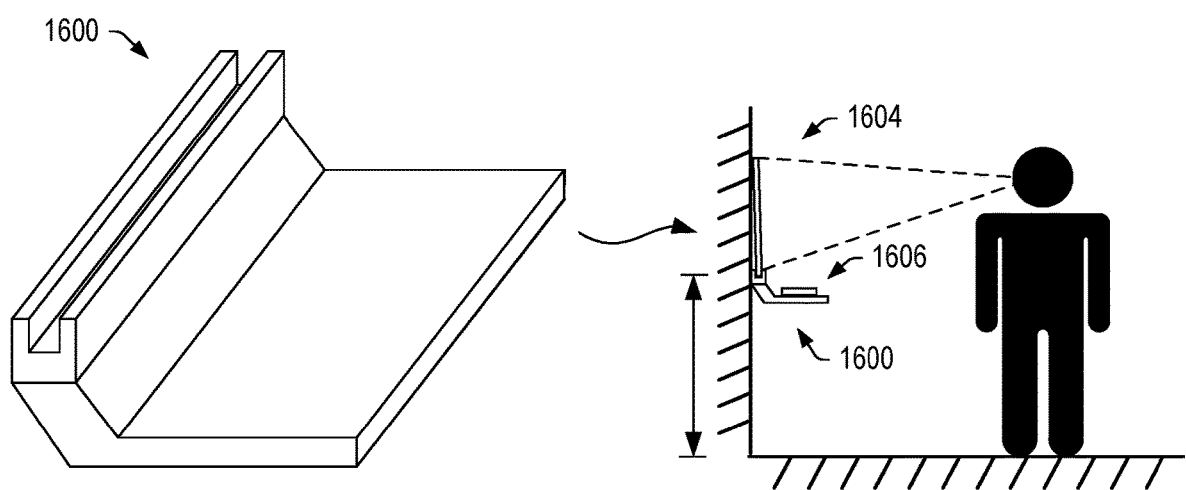

FIG. 16 shows an example of an assembly 1600 that includes the dock 1510 with the groove 1517. As shown, the dock 1510 can receive an accessory 1620, which may be configured to couple to the dock 1510. As shown, the assembly 1600 can support a display device 1604. In the example of FIG. 16, the accessor 1620 can be a shelf, which may include charging circuitry, for example, to charge a battery of a mobile device 1606.

Figure 17:
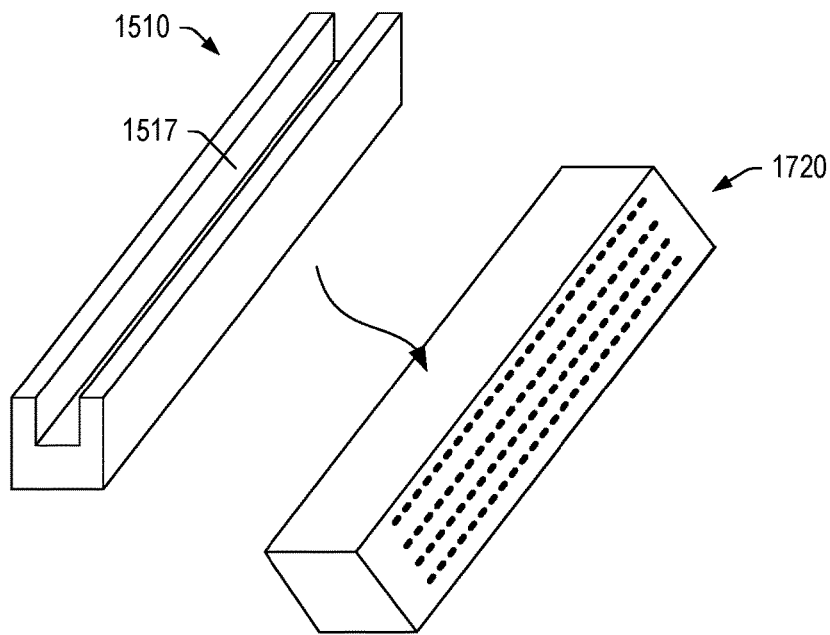
FIG. 17 is a series of perspective views of an example of an assembly.
Figure 17:
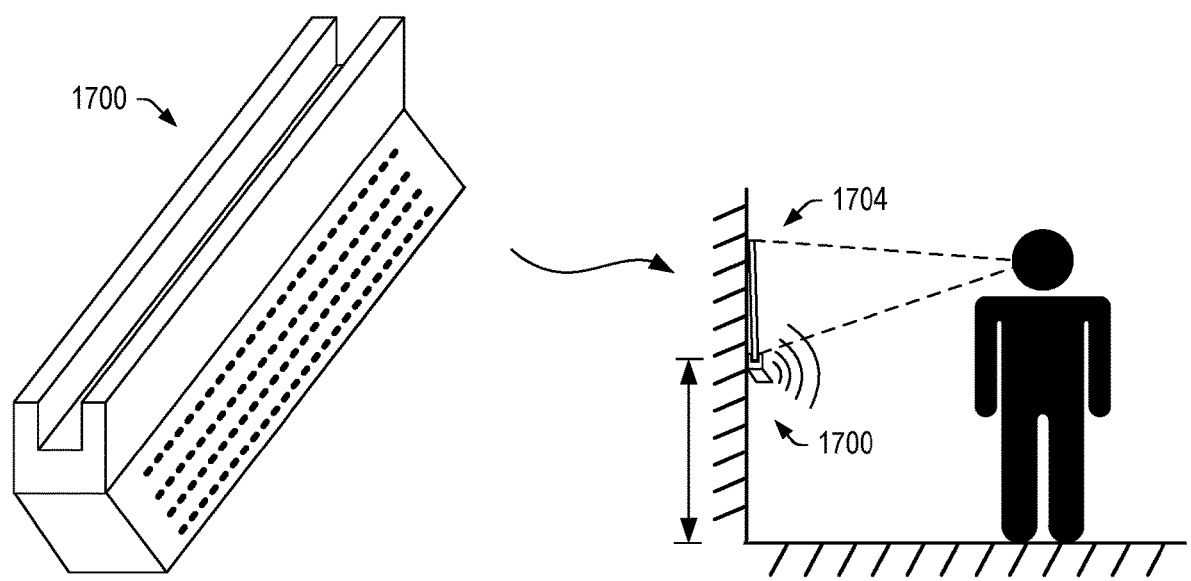

FIG. 17 shows an example of an assembly 1700 that includes the dock 1510 with the groove 1517. As shown, the dock 1510 can receive an accessory 1720, which may be configured to couple to the dock 1510. As shown, the assembly 1700 can support a display device 1704. In the example of FIG. 17, the accessor 1720 can be a speaker, which may include wired and/or wireless communication circuitry for receipt of audio signals.

Figure 18:
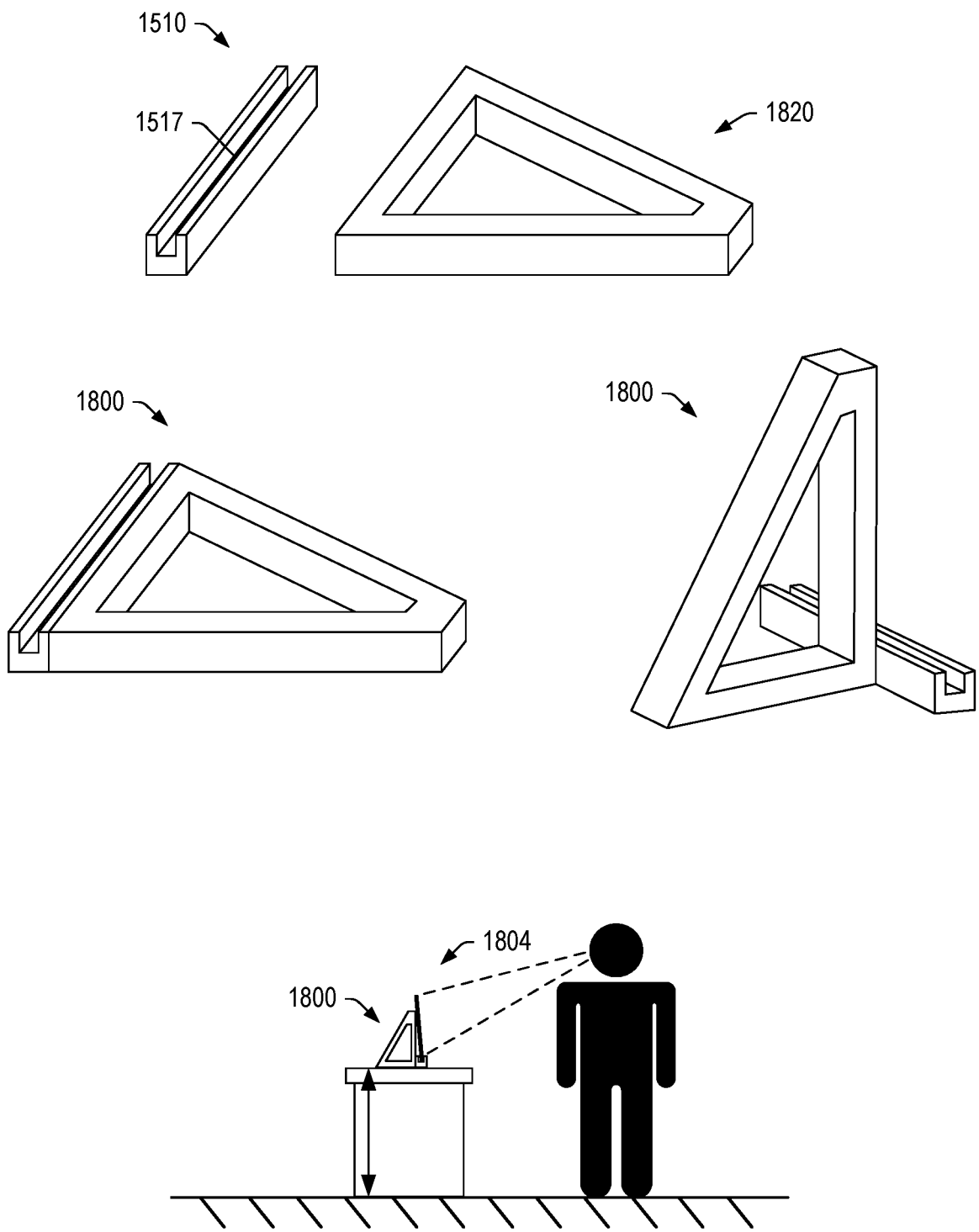
FIG. 18 is a series of perspective views of an example of an assembly.

FIG. 18 shows an example of an assembly 1800 that includes the dock 1510 with the groove 1517. As shown, the dock 1510 can receive an accessory 1820, which may be configured to couple to the dock 1510. As shown, the assembly 1800 can support a display device 1804. In the example of FIG. 18, the accessory 1820 can be a stand, which may include circuitry. As shown, the accessory 1820 may be fit to the dock 1510 in one or more manners. For example, a flat arrangement of the accessory 1820 can help to support the dock 1510 and an upright arrangement of the accessory 1820 can help to support the dock 1510 and/or a display device 1804.

As an example, a device dock can include a support for a display device; a top side; a bottom side that includes one or more feet; a sloped front side; a sloped back side, where the sloped back side slopes in a direction outwardly away from the bottom side; and a wall mount operatively coupled to the sloped back side. In such an example, the device dock can include a recess, where the support is a retractable support that retracts at least in part into the recess.

As an example, a support can include a groove. As an example, a support can include at least one speaker opening (e.g., consider a speaker grille, etc.).

As an example, a sloped front side of a device dock can include a front side slope angle that is greater than a back side slope angle of a back side.

As an example, a sloped back side can be at a back side slope angle greater than 90 degrees as measured with respect to a bottom side. In such an example, a sloped front side can be at a front side slope angle that is at least 2 degrees greater than the back side slope angle.

As an example, a device dock can include a wall mount that is integral to a back side of the device dock. As an example, a wall mount may be removably coupled to a back side of a device dock.

As an example, a device dock can include wireless charging circuitry (e.g., Qi specification circuitry, etc.). As an example, a device dock can include a stylus recess. As an example, a device dock can include a retractable foot.

As an example, a device dock can include a support with a retracted state and an extended state, where, in the retracted state, a front surface of the support is flush with the front side of the device dock (e.g., a region above the front surface of the support, etc.).

As an example, a device dock can include a light where, for example, the light is directed downwardly away from the bottom side. In such an example, the device dock can include a pull cord that switches the light. As an example, the pull cord may also be a power cord, which may be at a low voltage (e.g., less than approximately 100 V). For example, consider a USB type of cable utilized with a plug adapter fit in a wall socket where the cable may extend downwardly from the device dock (e.g., dangle) in a manner where it can be pulled to cause a light to turn on or off (e.g., or to turn the device dock on or off).

As an example, a device dock can include a support that is removable for coupling to an accessory. In such an example, an accessor may be a shelf (e.g., a charging shelf, etc.). As an example, a support may be removable and include a rechargeable battery such that it can be utilized in a cordless manner (e.g., cable-less manner) to power circuitry therein, where the removable support includes circuitry (e.g., speaker, light, etc.). As an example, an accessory may be a stand. As an example, a removable support of a device dock may include a wall mount (e.g., for mounting the support to a wall).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 19:
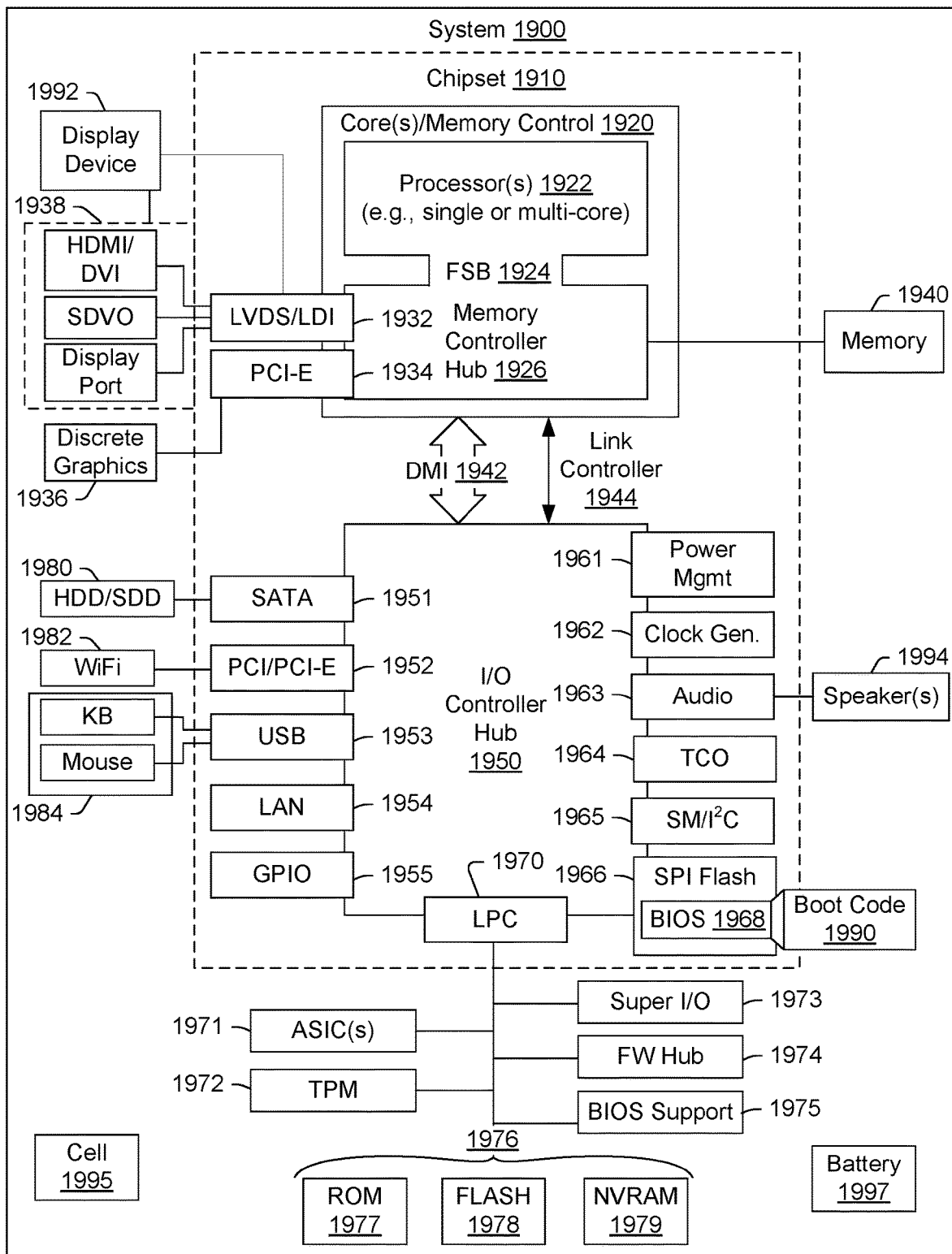
FIG. 19 is a diagram of an example of a system.

While various examples of circuits or circuitry have been discussed, FIG. 19 depicts a block diagram of an illustrative computer system 1900. The system 1900 may be a desktop computer system, such as one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a display device or other machine may include other features or only some of the features of the system 1900. As an example, a device dock, a support of a device dock, etc., may include one or more of the components illustrated in the computer system 1900. As explained, a device dock and/or a support can include circuitry, which may include one or more batteries (e.g., one or more lithium-ion batteries, etc.).

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 19, the system 1900 includes a so-called chipset 1910. A chipset refers to a group of integrated circuits, or chips, that are designed to work together. Chipsets are usually marketed as a single product (e.g., consider chipsets marketed under the brands INTEL®, AMD®, etc.).

In the example of FIG. 19, the chipset 1910 has a particular architecture, which may vary to some extent depending on brand or manufacturer. The architecture of the chipset 1910 includes a core and memory control group 1920 and an I/O controller hub 1950 that exchange information (e.g., data, signals, commands, etc.) via, for example, a direct management interface or direct media interface (DMI) 1942 or a link controller 1944. In the example of FIG. 19, the DMI 1942 is a chip-to-chip interface (sometimes referred to as being a link between a "northbridge" and a "southbridge").

The core and memory control group 1920 include one or more processors 1922 (e.g., single core or multi-core) and a memory controller hub 1926 that exchange information via a front side bus (FSB) 1924. As described herein, various components of the core and memory control group 1920 may be integrated onto a single processor die, for example, to make a chip that supplants the conventional "northbridge" style architecture.

The memory controller hub 1926 interfaces with memory 1940. For example, the memory controller hub 1926 may provide support for DDR SDRAM memory (e.g., DDR, DDR2, DDR3, etc.). In general, the memory 1940 is a type of random-access memory (RAM). It is often referred to as "system memory".

The memory controller hub 1926 further includes a low-voltage differential signaling interface (LVDS) 1932. The LVDS 1932 may be a so-called LVDS Display Interface (LDI) for support of a display device 1992 (e.g., a CRT, a flat panel, a projector, etc.). A block 1938 includes some examples of technologies that may be supported via the LVDS interface 1932 (e.g., serial digital video, HDMI/DVI, display port). The memory controller hub 1926 also includes one or more PCI-express interfaces (PCI-E) 1934, for example, for support of discrete graphics 1936. Discrete graphics using a PCI-E interface has become an alternative approach to an accelerated graphics port (AGP). For example, the memory controller hub 1926 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1950 includes a variety of interfaces. The example of FIG. 19 includes a SATA interface 1951, one or more PCI-E interfaces 1952 (optionally one or more legacy PCI interfaces), one or more USB interfaces 1953, a LAN interface 1954 (more generally a network interface), a general purpose I/O interface (GPIO) 1955, a low-pin count (LPC) interface 1970, a power management interface 1961, a clock generator interface 1962, an audio interface 1963 (e.g., for speakers 1994), a total cost of operation (TCO) interface 1964, a system management bus interface (e.g., a multi-master serial computer bus interface) 1965, and a serial peripheral flash memory/controller interface (SPI Flash) 1966, which, in the example of FIG. 19, includes BIOS 1968 and boot code 1990. With respect to network connections, the I/O hub controller 1950 may include integrated gigabit Ethernet controller lines multiplexed with a PCI-E interface port. Other network features may operate independent of a PCI-E interface.

The interfaces of the I/O hub controller 1950 provide for communication with various devices, networks, etc. For example, the SATA interface 1951 provides for reading, writing or reading and writing information on one or more drives 1980 such as HDDs, SDDs or a combination thereof. The I/O hub controller 1950 may also include an advanced host controller interface (AHCI) to support one or more drives 1980. The PCI-E interface 1952 allows for wireless connections 1982 to devices, networks, etc. The USB interface 1953 provides for input devices 1984 such as keyboards (KB), one or more optical sensors, mice and various other devices (e.g., microphones, cameras, phones, storage, media players, etc.). On or more other types of sensors may optionally rely on the USB interface 1953 or another interface (e.g., I²C, etc.). As to microphones, the system 1900 of FIG. 19 may include hardware (e.g., audio card) appropriately configured for receipt of sound (e.g., user voice, ambient sound, etc.).

In the example of FIG. 19, the LPC interface 1970 provides for use of one or more ASICs 1971, a trusted platform module (TPM) 1972, a super I/O 1973, a firmware hub 1974, BIOS support 1975 as well as various types of memory 1976 such as ROM 1977, Flash 1978, and non-volatile RAM (NVRAM) 1979. With respect to the TPM 1972, this module may be in the form of a chip that can be used to authenticate software and hardware devices. For example, a TPM may be capable of performing platform authentication and may be used to verify that a system seeking access is the expected system.

The system 1900, upon power on, may be configured to execute boot code 1990 for the BIOS 1968, as stored within the SPI Flash 1966, and thereafter processes data under the control of one or more operating systems and application software (e.g., stored in system memory 1940). An operating system may be stored in any of a variety of locations and accessed, for example, according to instructions of the BIOS 1968. Again, as described herein, a satellite, a base, a server or other machine may include fewer or more features than shown in the system 1900 of FIG. 19. Further, the system 1900 of FIG. 19 is shown as optionally include cell phone circuitry 1995, which may include GSM, CDMA, etc., types of circuitry configured for coordinated operation with one or more of the other features of the system 1900.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device dock comprising:
   a retractable support for a display device, wherein the retractable support comprises a front surface;
   a recess for the retractable support;
   a top side;
   a bottom side that comprises one or more feet;
   a sloped front side, wherein in a retracted position of the retractable support with respect to the recess, the front surface of the retractable support is flush with the sloped front side;
   a sloped back side, wherein the sloped back side slopes in a direction outwardly away from the bottom side; and
   a wall mount operatively coupled to the sloped back side.

2. The device dock of claim 1, wherein the retractable support comprises a groove.

3. The device dock of claim 1, wherein the retractable support comprises at least one speaker opening.

4. The device dock of claim 3, wherein the front surface of the retractable support comprises at least one of the at least one speaker opening.

5. The device dock of claim 1, wherein the sloped front side comprises a front side slope angle that is greater than a back side slope angle of the back side.

6. The device dock of claim 1, wherein the sloped back side comprises a back side slope angle greater than 90 degrees as measured with respect to the bottom side.

7. The device dock of claim 6, wherein the sloped front side comprises a front side slope angle that is at least 2 degrees greater than the back side slope angle.

8. The device dock of claim 1, wherein the wall mount is integral to the back side.

9. The device dock of claim 1, wherein the wall mount is removably coupled to the back side.

10. The device dock of claim 1, comprising wireless charging circuitry.

11. The device dock of claim 1, comprising a stylus recess.

12. The device dock of claim 1, comprising a retractable foot.

13. The device dock of claim 1, comprising a light.

14. The device dock of claim 13, wherein the light is directed downwardly away from the bottom side.

15. The device dock of claim 1, wherein the retractable support comprises a display device support surface, wherein in a retracted position of the retractable support, the display device support surface is disposed within the recess.

16. The device dock of claim 1, wherein the sloped front side extends from the top side to the recess.

17. A device dock comprising:
   a support for a display device, wherein the support is removable for coupling to an accessory;
   a top side;
   a bottom side that comprises one or more feet;
   a sloped front side;
   a sloped back side, wherein the sloped back side slopes in a direction outwardly away from the bottom side; and
   a wall mount operatively coupled to the sloped back side.

18. The device dock of claim 17, wherein the accessory comprises a shelf.

19. The device dock of claim 17, wherein the accessory comprises a stand.

20. The device dock of claim 17, wherein the support comprises a wall mount.

21. A device dock comprising:
   a support for a display device;
   a top side;
   a bottom side that comprises one or more feet;
   a sloped front side;
   a sloped back side, wherein the sloped back side slopes in a direction outwardly away from the bottom side;
   a wall mount operatively coupled to the sloped back side;
   a light, wherein the light is directed downwardly away from the bottom side; and
   a pull cord that switches the light.

* * * * *